US008717611B2

(12) United States Patent
Maki

(10) Patent No.: US 8,717,611 B2
(45) Date of Patent: May 6, 2014

(54) IMAGE PROCESSING APPARATUS THAT UPDATES A MESSAGE ON A SERVER AFTER AN IMAGE IS EDITED, THE SERVER PROVIDING A MICROBLOGGING FUNCTION

(71) Applicant: Canon Kabushiki Kaisha, Tokyo (JP)

(72) Inventor: Nobuhiko Maki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/754,520

(22) Filed: Jan. 30, 2013

(65) Prior Publication Data

US 2013/0215462 A1 Aug. 22, 2013

(30) Foreign Application Priority Data

Feb. 22, 2012 (JP) ................................. 2012-036763

(51) Int. Cl.
*G06F 3/12* (2006.01)
(52) U.S. Cl.
USPC ........................................................ 358/1.15

(58) Field of Classification Search
USPC .......................................................... 358/1.15
See application file for complete search history.

(56) References Cited

U.S. PATENT DOCUMENTS

2013/0304836 A1* 11/2013 Ku et al. ....................... 709/206

FOREIGN PATENT DOCUMENTS

JP 2000-207300 7/2000

* cited by examiner

*Primary Examiner* — Eric A Rust
(74) *Attorney, Agent, or Firm* — Fitzpatrick, Cella, Harper & Scinto

(57) ABSTRACT

In the case where input image data is saved to a scan data DB, a first message is registered to a server, and when an instruction to edit the image data is made, image data saved in the scan data DB relating to the instruction is extracted, and when an editing target is selected from the extracted image data, the editing target image data is updated with the input image data, and a second message indicating that the image data was updated is associated with the first message relating to the image data.

12 Claims, 23 Drawing Sheets

| SCAN DOCUMENT ID | SCAN DOCUMENT NAME | MESSAGE ID | USER ID |
|---|---|---|---|
| 0001 | AA MEETING MINUTES | 147051 | USER-A |
| 0002 | AA MEETING DISTRIBUTION MATERIAL | 825089 | USER-A |
| 0003 | BB PROJECT SCHEDULE | 344583 | USER-B |
| 0004 | CC APPLICATION FORM | 439097 | USER-C |

FIG. 13

| SCAN DOCUMENT ID (701) | SCAN DOCUMENT NAME (702) | MESSAGE ID (703) | USER ID (704) |
|---|---|---|---|
| 0001 | AA MEETING MINUTES | 147051 | USER-A |
| 0002 | AA MEETING DISTRIBUTION MATERIAL | 825089 | USER-A |
| 0003 | BB PROJECT SCHEDULE | 344583 | USER-B |
| 0004 | CC APPLICATION FORM | 439097 | USER-C |
| 0005 | AA MEETING MINUTES SUPPLEMENT | 147051 | USER-A |

| COMMAND STRING | PROCESSING FUNCTION |
|---|---|
| send | SEND FUNCTION |
| print | PRINT FUNCTION |

| PROTOCOL STRING | PROCESSING FUNCTION |
|---|---|
| me | MAIL SEND FUNCTION |
| email | MAIL SEND FUNCTION |
| e-mail | MAIL SEND FUNCTION |
| mail | MAIL SEND FUNCTION |
| document | CLOUD SERVICE SERVER STORAGE FUNCTION |

| PARAMETER STRING | PROCESSING FUNCTION |
|---|---|
| pdf | PDF CONVERSION PROCESSING |
| xps | XPS CONVERSION PROCESSING |
| jpeg | JPEG CONVERSION PROCESSING |

(2021) (2022) ~2020

IMAGE PROCESSING APPARATUS THAT UPDATES A MESSAGE ON A SERVER AFTER AN IMAGE IS EDITED, THE SERVER PROVIDING A MICROBLOGGING FUNCTION

BACKGROUND OF THE INVENTION

1. Field of the Invention

The present invention relates to an image processing apparatus that can communicate with a server that provides a microblogging function, and to a control method and computer-readable storage medium thereof.

2. Description of the Related Art

In recent years, cloud computing systems have become commonplace as the form of systems that provide services using the internet. Due to this, users, without preparing hardware resources such as a server, if they provide a minimal connection environment, can use services called cloud services provided by cloud computing systems. As for cloud services that have already been realized, there are CRM (Customer Relationship Management) services that provide CRM system functions for carrying out customer management and sales support. As for other cloud services, there are document management services that provide storage and management functions for the storage and management of electronic files.

Furthermore, there are also services that provide a microblogging function as a communication tool. A microblogging function is a short blog function in which users holding accounts of the service make available "messages" and "comments" in 100 to 200 characters called "microposts". The user here is not limited to being an actual user (person) and also includes such things as, for example, printers, linkage services, and objects in cloud services and applications. A unique identifier is assigned to each "message", "comment", etcetera that a user posted or sent. In a microblogging function, when a user registers a "message", a "timeline", which is a list of "comments" related to the "message" and through which comment registration, display and management is possible, is created. The user that registered the "message", and other users, by registering related information as "comments" on the "timeline", exchange information and communicate. For each user account, there is a function for managing the profile of the user, so it is possible to know what kind of person a communication partner is. For example, information such as the name of the user, contact details (email address, telephone number, address, etcetera), and groups they are a part of is managed.

Amongst CRM (Customer Relationship Management) services provided as cloud services, there are examples in which a microblogging function to be used as a communication tool during work is provided. In these cloud services, client information, business discussions, etcetera is linked to "messages", "comments", etcetera, in order to further improve the user's convenience of use. Furthermore, at the same time, in CRM services, file sharing functions are provided in which files are shared between users, wherein the files can be saved, edited, updated, and referenced. An example of this is Chatter provided by Salesforce.com as a microblogging function. Document, File, etcetera are examples of file sharing functions.

Furthermore, amongst image processing apparatuses such as multi function peripherals, improvement and increase in functions have been continuing. In recent years image processing apparatuses have been developed equipped with not only the standard functions of scan and print for digitization of paper documents and printing, but also network interfaces (hereinafter referred to as "network I/F"). For example, an image processing apparatus equipped with a network I/F can send image data, formed by scanning a paper document, to a cloud document management service to store the data. Furthermore, by registering as a "message" to a microblogging function of a cloud service information related to image data stored on a cloud document management service or information related to image data stored on an image processing apparatus itself, it is possible to notify another cloud service user with the information. Accordingly, by using this kind of function, distribution of image data to other users is realized.

In Japanese Patent Laid-Open No. 2000-207300, a proposed technique is of sending, attached to an email, a URL that specifies the storage location of information for which distribution is desired. By this technique, the receiver of the distribution, having received the distribution notification of information by an email, can obtain the information by directly accessing the URL attached in the email, and the distributor can check if the receiver of the distribution has accessed the information.

However, these conventional techniques have the following kinds of problems.

For example, there are cases where it is desired that a replacement be made in order to add to or correct information (image data, etcetera) that has already been distributed, and there are cases where it is desired that information related to information that has already be distributed be added and distributed. In these kinds of cases it is necessary to notify by once again registering a message to the microblogging function or to notify by an email, etcetera. In this case, there is the issue that it is difficult for the user that received a second notification, to understand its relation to previously distributed information. In other words, when the replacement of information occurs, it is difficult for the user to distinguish if this is new information or if it is a replacement of information that was previously received. Furthermore, in the case where information was added, it is difficult to distinguish what information the information is related to, etcetera.

Furthermore, in the case of registering once again a message to a microblogging function, even if the message is information related to a previously registered message or to the timeline of the previously registered message, the message is registered as a new message independent of the timeline. For this reason, there is a possibility that a browsing user will miss a notification of the replacement or adding of information.

SUMMARY OF THE INVENTION

An aspect of the present invention is to eliminate the above-mentioned problems with the conventional technology.

A feature of the present invention is to provide a technique to notify a user in an easy to understand way with information in a case where replacement or addition of image data managed by an image processing apparatus occurs.

According to an aspect of the present invention, there is provided an image processing apparatus capable of communicating with a server having a microblogging function for making available a message registered by a user to another user, the image processing apparatus comprising: an input unit configured to input image data; a storage unit configured to store image data; a registration unit configured to register a first message to the server in a case where the image data input by the input unit is stored by the storage unit; an extraction unit configured to extract, when an instruction is made for editing of image data, the image data stored by the storage unit being associated with the instruction; an editing unit configured to edit, when editing target image data is selected from the image data extracted by the extraction unit, the editing target image data with the image data input by the input unit; and a control unit configured to control so that, in a case where the editing target image data is edited by the editing unit, a second message, that indicates that the image data has been edited, is registered to the server associated with the first message which is related to the editing target image data.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a diagram for illustrating an example of a scan data management table according to the third embodiment of the present invention.

FIG. 20A is a diagram for illustrating an example of a command string management table according to the fourth embodiment of the present invention.

FIG. 20B is a diagram for illustrating an example of a protocol string management table according to the fourth embodiment of the present invention.

FIG. 20C is a diagram for illustrating an example of a parameter string management table according to the fourth embodiment of the present invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
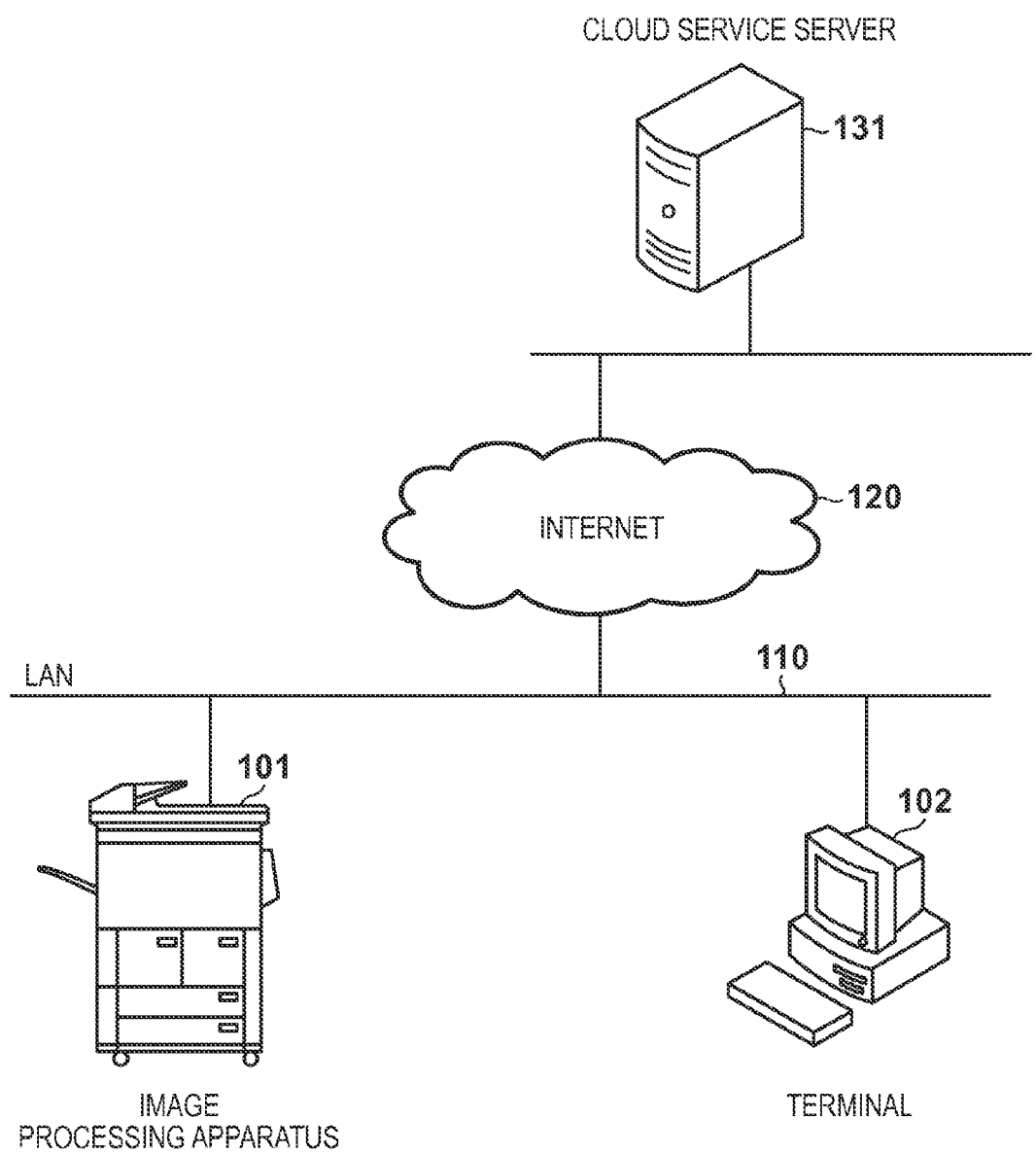
FIG. 1 is an overall view of an image processing system according to a first embodiment of the present invention.

FIG. 1 is an overall view of an image processing system according to a first embodiment of the present invention.

The image processing system according to this embodiment provides an image processing apparatus 101, a terminal (personal computer: PC) 102, and a cloud service server 131. To a LAN 110, the image processing apparatus 101, and the terminal 102 are connected so that communication is possible. Furthermore, the LAN 110 is connected so that it is possible to communicate with the Internet 120, and the image processing apparatus 101, the terminal 102, etcetera are connected via the Internet 120 to the cloud service server 131. Here, the terminal 102 is connected to the LAN 110, but the current invention is not limited to this. It is enough that the terminal 102 can connect to the cloud service server 131.

Figure 2:
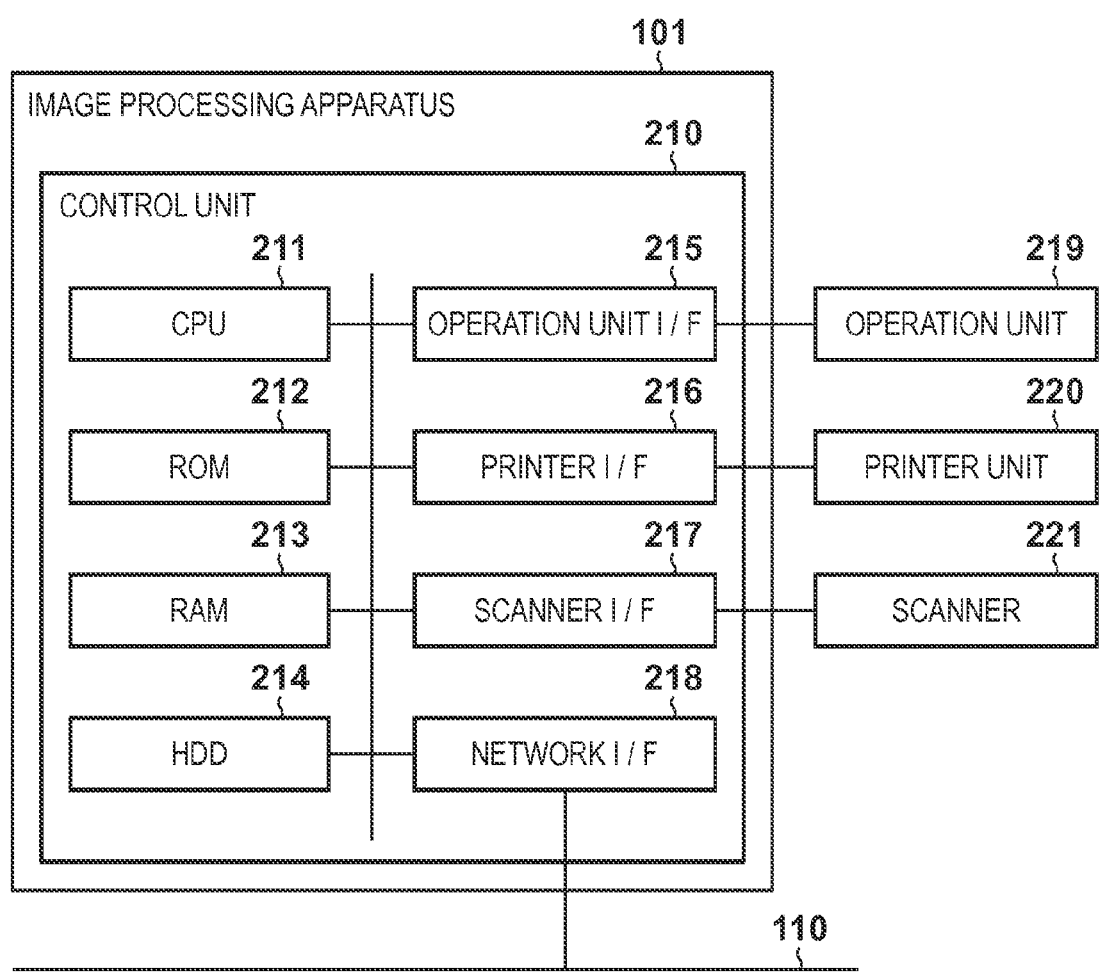
FIG. 2 is a block diagram for illustrating a hardware configuration of an image processing apparatus according to the first embodiment of the present invention.

FIG. 2 is a block diagram for illustrating a hardware configuration of the image processing apparatus 101 according to the first embodiment of the present invention.

As for the hardware configuration, the image processing apparatus 101 provides a control unit 210, an operation unit 219, a printer unit 220, and a scanner 221. The control unit 210 provides a CPU 211, a ROM 212, a RAM 213, an HDD 214, an operation unit I/F 215, a printer I/F 216, a scanner I/F 217, and a network I/F 218.

The control unit 210, containing the CPU 211, controls overall operation of the image processing apparatus 101. The CPU 211 reads a control program stored in the ROM 212, and carries out various control such as reading control and sending control. The RAM 213 is the main memory of the CPU 211, and is used as a temporary storage area such as a work area. The HDD (hard disk drive) 214 stores such things as image data, various types of programs and various types of information tables. The operation unit I/F 215 connects the operation unit 219 and the control unit 210. In the operation unit 219, such things as, for example, an LCD display unit with a touch panel function, and a keyboard are provided. Note, a program executed by the CPU 211 may be installed in the HDD 214, loaded by a boot program that is stored on the ROM 212 into the RAM 213 and executed.

The printer I/F 216 connects the printer unit 220 and the control unit 210. Data to be printed by the printer unit 220 is transferred from the control unit 210 via the printer I/F 216 and printed, in the printing unit 220, onto a recording medium. The scanner I/F 217 connects the scanner 221 and the control unit 210. The scanner 221 reads an image on a document, outputs image data and inputs the image data into the control unit 210 via the scanner I/F 217. The network I/F 218 connects the control unit 210 (the image processing apparatus 101) to the LAN 110. The network I/F 218 sends image data, information, etcetera to outside apparatuses (for example, the cloud service server 131) via the LAN 110 and the Internet 120, and the network I/F 218 receives various kinds of information from outside apparatuses.

Figure 3:
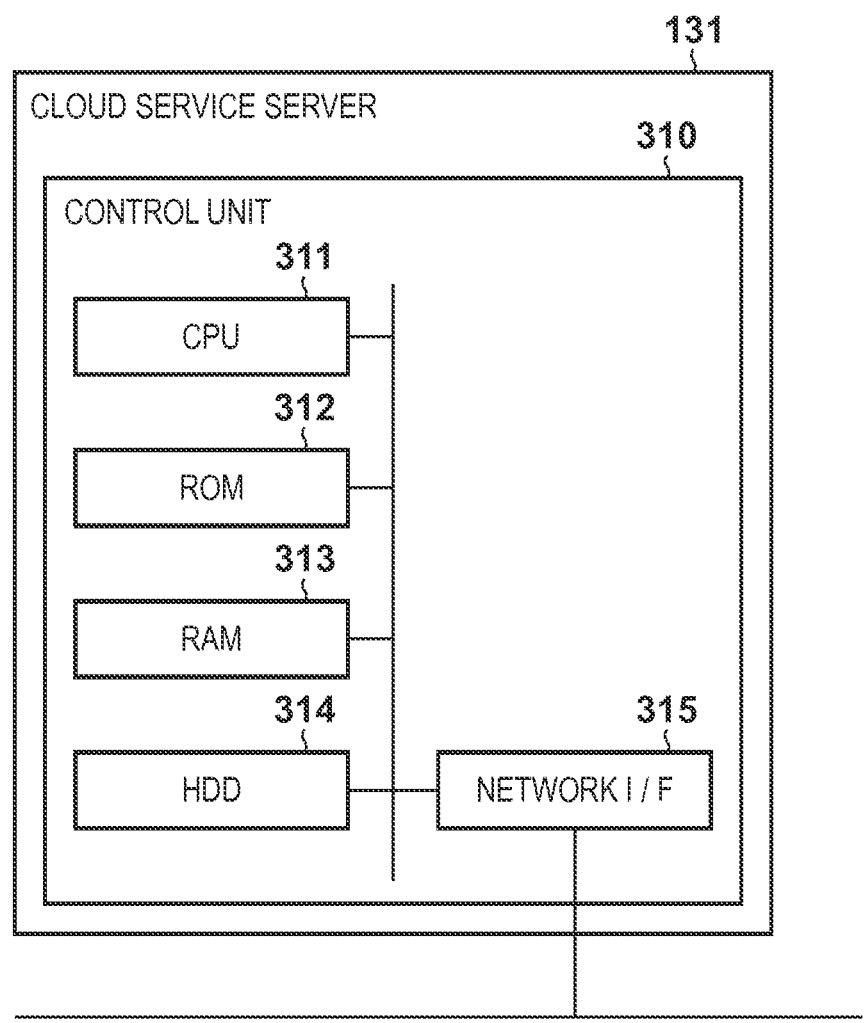
FIG. 3 is a block diagram for illustrating a configuration of a cloud service server according to the first embodiment of the present invention.

FIG. 3 is a block diagram for illustrating a configuration of the cloud service server 131 according to the first embodiment of the present invention. Note, the hardware configuration of the terminal 102 is the same as the configuration of the cloud service server 131 and so explanation has been omitted.

A control unit 310, that includes a CPU 311, controls the operation of the cloud service server 131 on the whole. The CPU 311, according to a control program loaded into a RAM 313 from an HDD 314 by a boot program stored in a ROM 312, performs various kinds of control processing. The RAM 313 is the main memory of the CPU 311, and is used as a temporary storage area such as a work area. The HDD 314 stores such things as image data, various types of programs and various types of information tables. A network interface I/F 315 connects the cloud service server 131 to the Internet 120, and sends various kinds of information to and receives various kinds of information from apparatuses on the LAN 110 via the Internet and the LAN 110.

Figure 4:
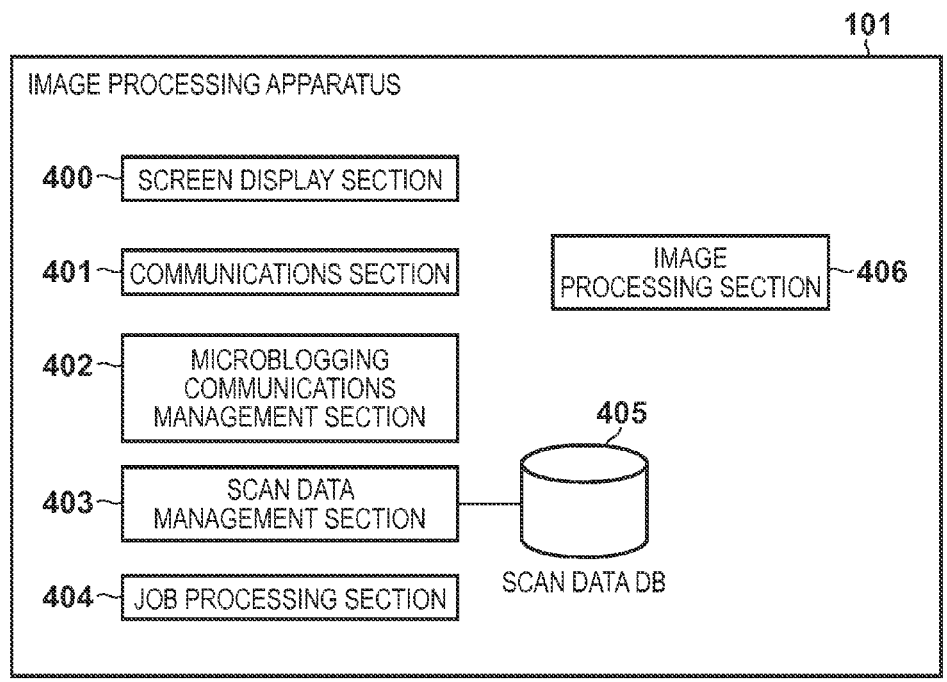
FIG. 4 is a diagram for describing a software configuration of the image processing apparatus according to the first embodiment of the present invention.

FIG. 4 is a diagram for describing a software configuration of the image processing apparatus 101 according to the first embodiment of the present invention. Each of the functional sections shown in FIG. 4 is realized through the CPU 211 of the image processing apparatus 101 reading control programs from the ROM 212, the HDD 214 or the like, loading the programs into the RAM 213 and executing the programs.

As for the software configuration, the image processing apparatus 101 has a screen display section 400, a communications section 401, a microblogging communications management section 402, a scan data management section 403, a job processing section 404 and an image processing section 406. Furthermore, the image processing apparatus 101 has a scan data database (hereinafter referred to as "scan data DB") 405 that stores scan data.

The screen display section 400 displays a screen for giving an instruction to perform a scan operation to the operation unit 219, and gives out scan job execution instructions to the job processing section 404 in response to instructions from a user. The communications section 401 sends requests to the cloud service server 131 in response to an instruction from the microblogging communications management section 402. Furthermore, the communications section 401 receives a response from the cloud service server 131 (a response to the request).

When the microblogging communications management section 402 detects that scan data was stored into the scan data DB 405 upon a notification from the job processing section 404, the microblogging communications management section 402 sends, to the cloud service server 131, a message containing informing text to the effect that scan data was stored. Here, the text informing to the effect that scan data was stored is text that a person can understand, such as, for example, "Scan data preparation completed". Furthermore, the microblogging communications management section 402 carries out management of sent messages.

The scan data management section 403 makes store instructions for scan data generated by the job processing section 404 to the scan data DB 405, and obtains the scan data stored in the scan data DB 405. The job processing section 404, according to scan job execution instructions from an operator via the screen display section 400, makes a request to the control unit 210 for the execution of a scan job, and as a result receives image data that the scanner 221 generated by reading an image on a document. Next, the job processing section 404 notifies the scan data management section 403 to the effect that the preparation for storing of the image data, as scan data, in the scan data DB 405 has completed. The scan data DB 405, according to an instruction from the scan data management section 403, stores the scan data generated by the job processing section 404 into a memory of the HDD 214 or the like, obtains the stored scan data, and sends the data to the scan data management section 403. The image processing section 406 carries out correction, processing, editing, resolution conversion and the like. In addition to this, the image processing section 406 carries out image data rotation and compression/decompression of JPEG, MMR, etcetera. Furthermore the image processing section 406 carries out electronic file format conversion into PDF, XPS, XML and the like.

Figure 5:
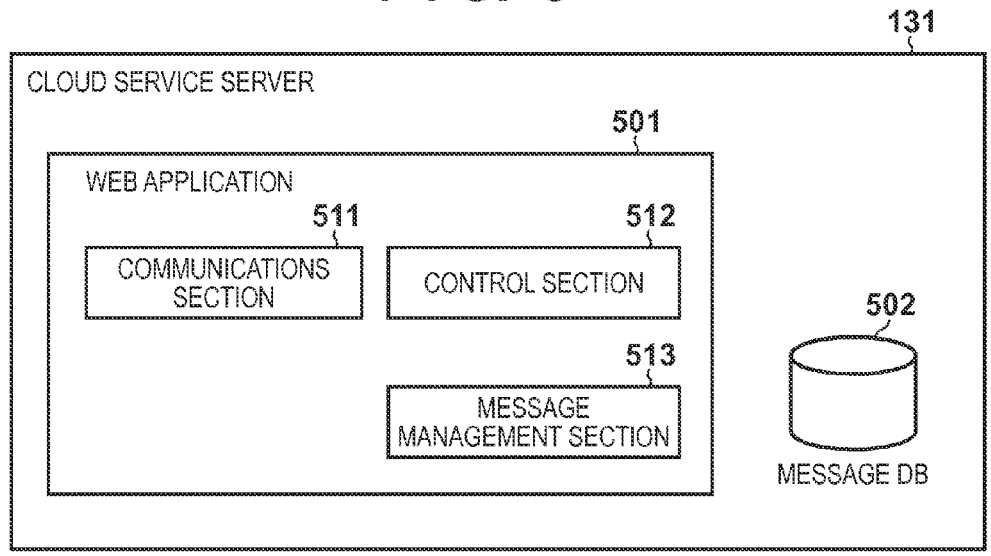
FIG. 5 is a diagram for describing a software configuration of the cloud service server according to the first embodiment of the present invention.

FIG. 5 is a diagram for describing a software configuration of the cloud service server 131 according to the first embodiment of the present invention. Each of the functional sections shown in FIG. 5 is realized through the CPU 311 of the cloud service server 131 reading control programs from the ROM 312, the HDD 314 or the like, loading the programs into the RAM 313 and executing the programs.

The cloud service server 131 has a Web application 501 and a message database 502 (hereinafter referred to as "message DB 502"). The Web application 501 is a Web application for providing a CRM service, etcetera. In this embodiment, a microblogging function is provided in the Web application 501. The Web application 501 has a communications section 511, a control section 512 and a message management section 513.

The communications section 511 receives a request from the image processing apparatus 101 or the terminal 102 (PC, etcetera), and sends the contents of the request to the control section 512. Furthermore, the communications section 511 receives the processing result of the request from the control section 512, generates response data for the request, and sends the response data to the image processing apparatus 101 or the terminal 102. The control section 512, according to the contents of the request sent by the communications section 511, extracts a message or a comment included in the request, and makes a request to the message management section 513 for the registration processing of the message or the comment. The message management section 513, receives and stores to the message DB 502 the message or the comment sent from the control section 512. Furthermore, the message management section 513, according to the request from the control section 512, obtains from the message DB 502 and sends to the control section 512 the message or the comment that was registered in the message DB 502.

Next, referring to FIG. 6, the microblogging function that is provided on the cloud service server 131 according to the first embodiment of the present invention will be explained. This microblogging function indicates a function in which messages registered by apparatuses connected to the cloud service server 131 are made available to a plurality of other apparatuses. Normally there may be only a small number of characters, between 150 and 200 characters, in a message.

Figure 6:
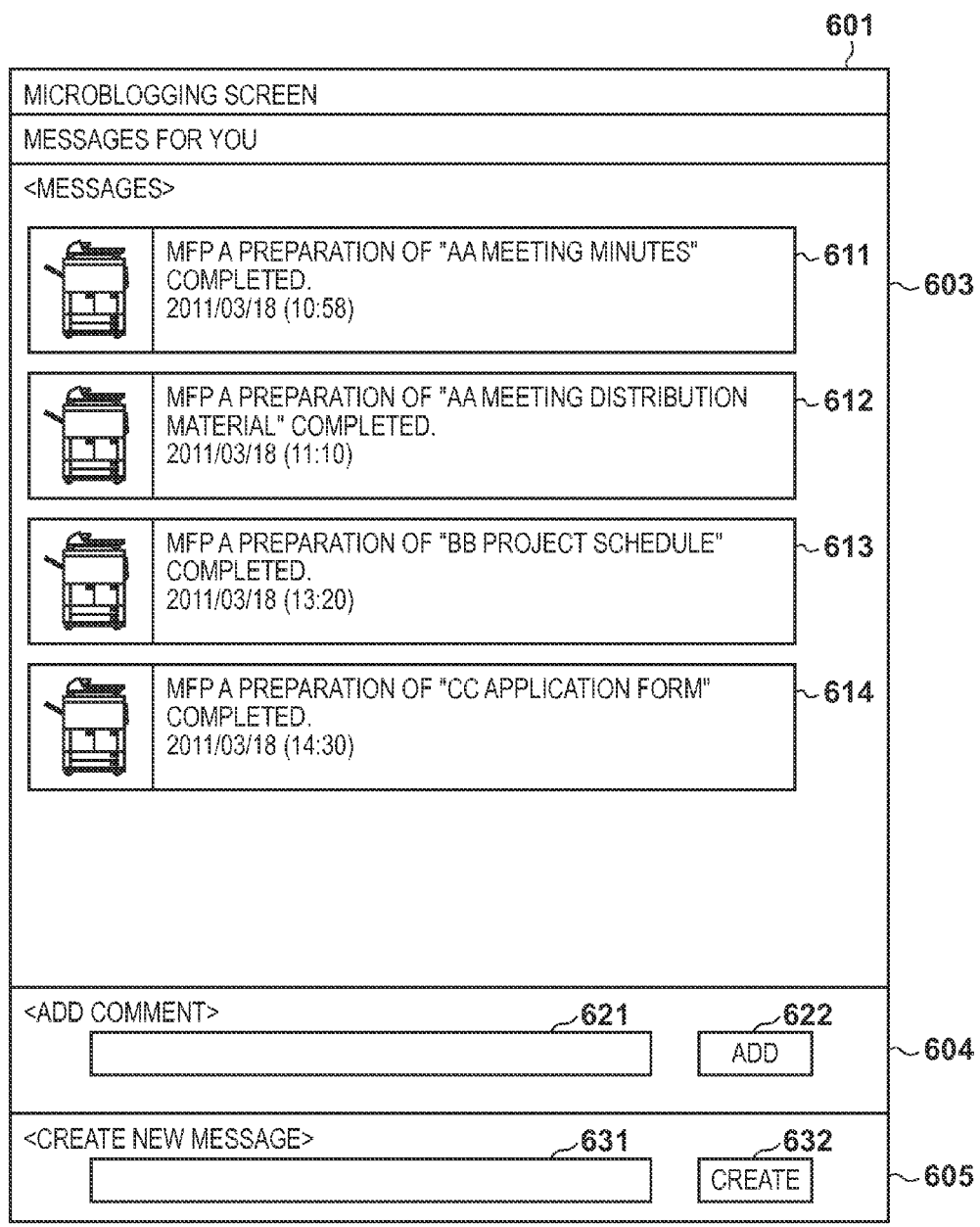
FIG. 6 is a diagram for illustrating an example of a Web page that is displayed when the cloud service server is accessed from a Web browser running on a terminal (PC etcetera) according to the first embodiment of the present invention.

FIG. 6 is a diagram for illustrating an example of a Web page that is displayed when the cloud service server 131 is accessed from a browser running on the terminal 102 (PC etcetera) according to the first embodiment of the present invention. In this example, the cloud service server 131 is managing messages for a user operating the terminal 102.

On a microblogging screen 601, the cloud service server 131 displays messages for the user of the terminal 102. The terminal 102 displays the microblogging screen 601 on a display unit according to the screen information received from the cloud service server 131. A message display area 603 displays both messages and comments related to the messages in a timeline structure. The message display area 603 is showing a situation in which "MFP (multi function peripheral) A", the image processing apparatus 101 according to this embodiment, has registered a message indicating that the storing of scan data into the scan data DB 405 has completed and thereby it has become possible for other users to obtain the data. Messages 611-614 show examples of messages indicating that the MFP A has completed preparation of 4 respective pieces of scan data.

In a comment input area 604, when the operator of the terminal 102 inputs a comment into a comment input box 621 and presses an ADD button 622, an add comment request is sent from the Web browser to the client service server 131. The cloud service server 131, having received this add request, registers the comment input into the comment input box 621. With this, when a user accesses the cloud service server 131 on a Web browser, the comment that was registered on the Web browser is displayed. Note, regarding examples of the display of comments, an explanation will be given in an embodiment described later.

In a message input area 605, when the operator of the terminal 102 inputs a message into a message input box 631 and presses a CREATE button 632, a message create request is sent from the Web browser to the cloud service server 131. The cloud service server 131, having received this request, registers the message input into the message input box 631. With this, when a user accesses the cloud service server 131 on a Web browser, in the same way as the previously discussed messages 611-614, the created message is displayed on the Web browser.

Figures 7, 8:
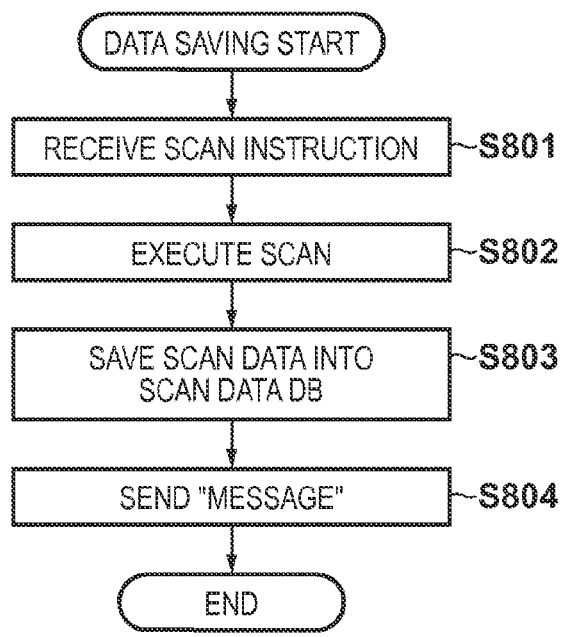
FIG. 7 is a diagram for describing an example of a scan data management table according to the first embodiment of the present invention.
FIG. 8 is a flowchart for describing a processing series starting from a reading operation of image data by the image processing apparatus, including a saving of scan data, and continuing until a sending of a message according to the first embodiment of the present invention.

FIG. 7 is a diagram for describing an example of a scan data management table according to the first embodiment of the present invention.

This table is maintained in the HDD 214 in order to manage scan data that the scan data management section 403 of the image processing apparatus 101 stored in the scan data DB 405. In this scan data management table, a scan document ID 701, a scan document name 702, a message ID 703 and a user ID 704 are stored. For the scan document ID 701, an ID that does not have a duplicate in the scan data management table (identifier information) is generated and stored. For the scan document name 702, a string indicating the document name of the scan data is stored. In this embodiment, scan data is in an internal format of the image processing apparatus 101 and is stored in a data format formed according to a compression method appropriate for printing. The message ID 703 is stored for identifying a message corresponding to scan data and is assigned by the cloud service server 131. For the user ID 704, a user ID for identifying the user that stored the scan data into the scan data DB 405 is stored.

For example, in a record 705, the scan document ID 701 of the scan data is "0001", the scan document name 702 is "AA meeting minutes", the message ID 703 is "147051" and the user ID 704 is "USER-A".

FIG. 8 is a flowchart for describing a processing series starting from a reading operation of image data by the image processing apparatus 101, including a saving of scan data, and continuing until a sending of a message according to the first embodiment of the present invention. The processing explained below is realized through the CPU 211 of the image processing apparatus 101 reading control programs from the ROM 212, the HDD 214 or the like, loading the programs into the RAM 213 and executing the programs. Furthermore, before the processing sequence of FIG. 8 is performed, the image processing apparatus 101 carries out processing such as authentication of an operator to recognize the user ID that uniquely specifies the operator.

Firstly in step S5801, the screen display section 400 detects a scan execution instruction due to an operation of a user using the operation unit 219. Here, it is possible to set settings for reading the document and to set the document name of the read-in electronic data. Settings made in order to read the document such as setting of the resolution, setting of the color mode and setting of whether both sides are to be read can be carried out. Next, the processing proceeds to step S802, and the screen display section 400, having detected the scan execution instruction, notifies the job processing section 404 with a scan job execution instruction. When the job processing section 404 receives the scan job execution instruction, the job processing section 404 makes a request to the control unit 210 to perform scan processing. Due to this, the control unit 210 causes the scanner 221 to execute a scan of the document via the scanner I/F 217 with an execution request. In this way the scanner 221 according to the request from the control unit 210 reads an image on a document, generates image data, and sends the image data via the scanner I/F 217 to the control unit 210. The control unit 210, having received this image data, sends the image data to the job processing section 404 as the scan execution result.

Next the processing proceeds to step S803, and the job processing section 404 receives the image data and notifies the scan data management section 403 to the effect that the image data will be stored as scan data. The scan data management section 403, having received the notification from the job processing section 404, stores as scan data the received image data into the scan data DB 405, and notifies the job processing section 404 to the effect that the storing of the scan data has completed. Furthermore, at the same time as the storing of the scan data, the various types of information are stored into the scan data management table shown in FIG. 7. For example, in the case where the operator that operates the image processing apparatus 101 has a user ID of "USER-A", and the document name of the scan data to be stored is "AA meeting minutes", a record such as the record 705 of FIG. 7 is added to the scan data management table.

Next, the processing proceeds to step S804, and when the job processing section 404 receives a notification that the storing of the scan data completed, the job processing section 404 makes a request to the microblogging communications management section 402 that a message be sent. The microblogging communications management section 402, having received the request from the job processing section 404, generates a message including contents to the effect of "Preparation of "AA meeting minutes" completed", and sends that message along with a message send request to the communications section 401. Here, information that a user can use to determine what kind of document was scanned such as, for example, information for the document name, is added to the message and sent. The communications section 401, having received the message send request from the microblogging communications management section 402, sends the received message to the cloud service server 131. Due to this, the message is registered to the microblogging function provided by the cloud service server 131. The communications section 401 replies to the microblogging communications management section 402 with message register completion result information received from the cloud service server 131. The microblogging communications management section 402 notifies the scan data management section 403 with the message ID obtained from the message register completion result information. The scan data management section 403 stores the obtained message ID in the message ID 703 field of the record registered in the scan data management table in step S803.

Due to this, in the microblogging provided by the cloud service server 131, a "timeline" for a message is generated. Then, when a user accesses the cloud service server 131 using a Web browser, etcetera, the message is displayed in the microblogging screen 601 as shown in FIG. 6. In this way, through the sending and receiving of messages and comments, etcetera, it is possible to carry out information exchange with other users.

Next, referring to FIG. 9 and FIG. 10, a processing sequence in the image processing apparatus 101 according to this embodiment from a operation of reading image data, including the updating of scan data and going until the sending of a message will be explained. Before performing the processing sequence of FIG. 10, the image processing apparatus 101 carries out processing such as authentication of the operator to recognize the user ID that uniquely specifies the operator.

Figure 9:
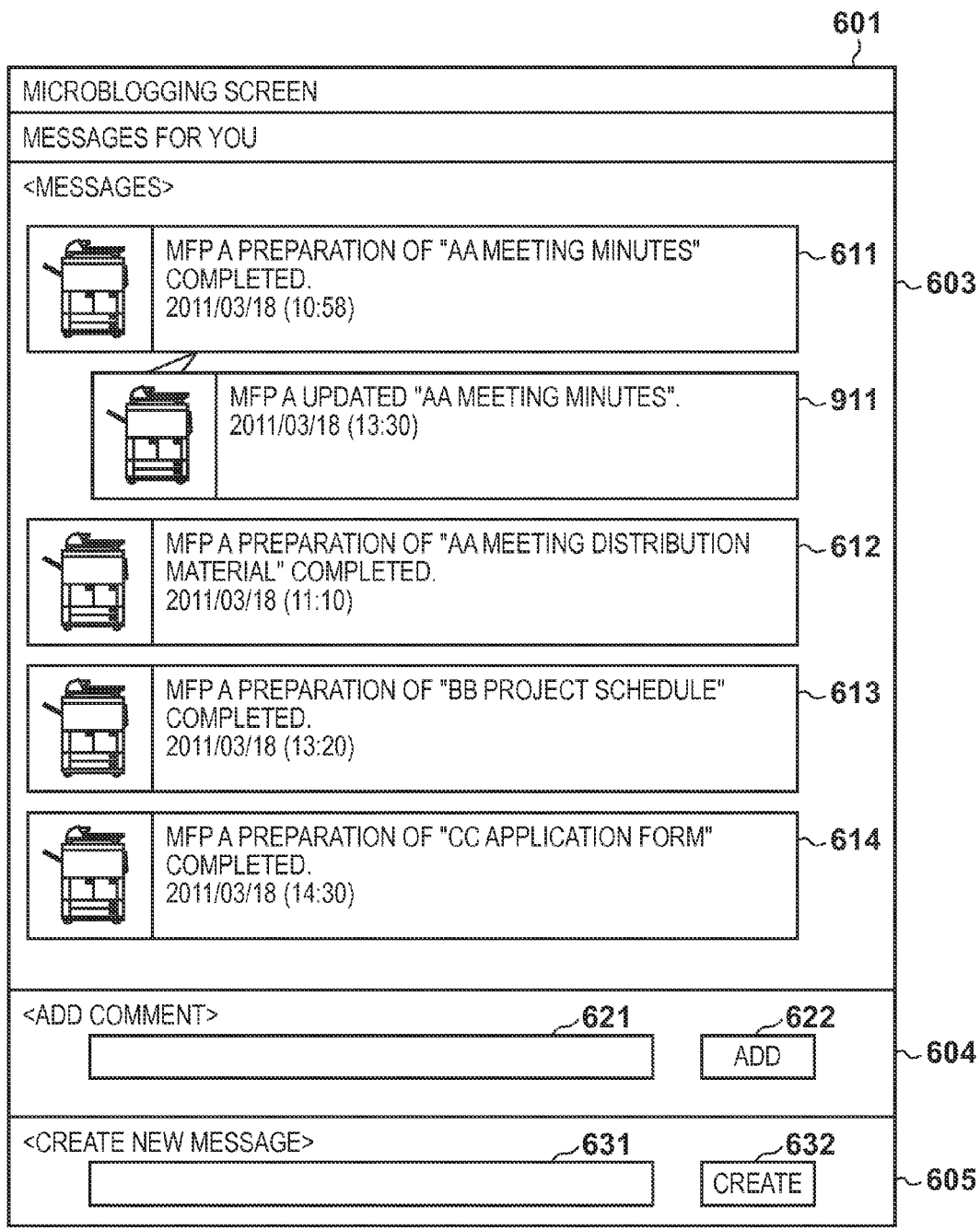
FIG. 9 is a diagram for illustrating an example of a microblogging screen according to the first embodiment of the present invention.

FIG. 9 is a diagram for describing an example of a microblogging screen according to the first embodiment of the present invention. Note, in FIG. 9, parts that are common to previously discussed FIG. 6 are shown with the same reference numerals and explanation of these parts is omitted.

Figure 10:
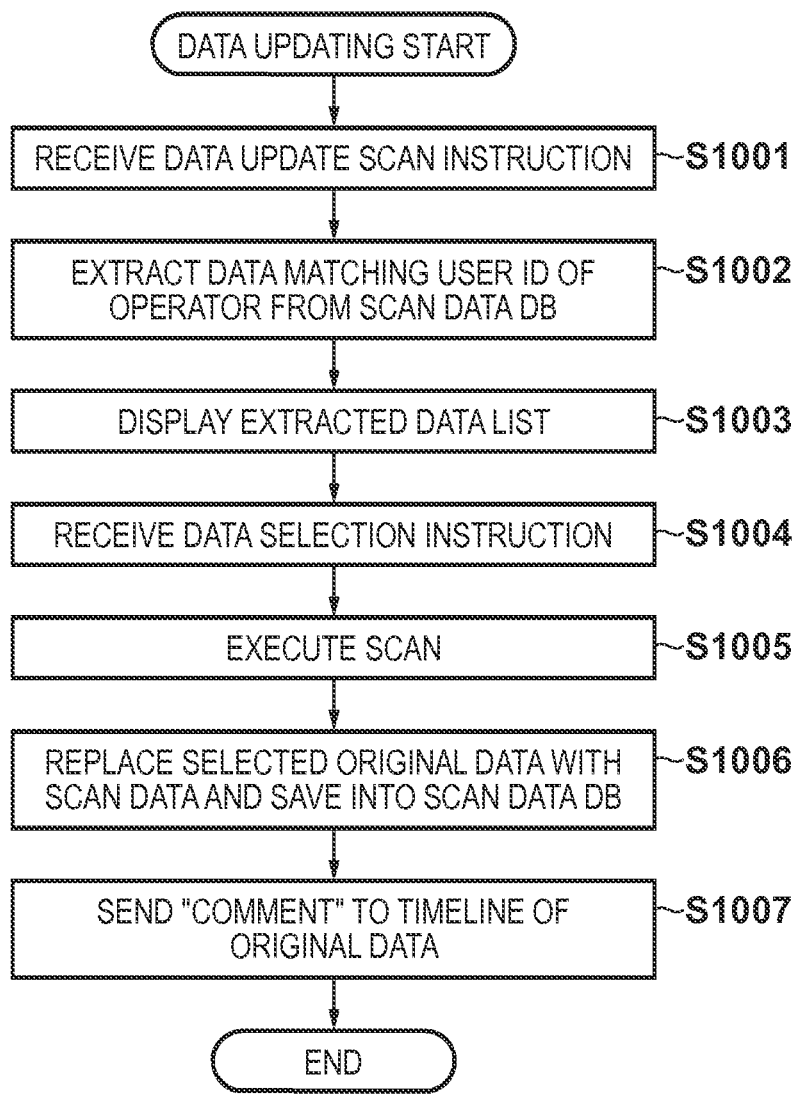
FIG. 10 is a flowchart for describing a processing series that the image processing apparatus carries out when scan data is updated according to the first embodiment of the present invention.

FIG. 10 is a flowchart for describing a processing series that the image processing apparatus carries out when scan data is updated according to the first embodiment of the present invention. This processing is realized through the CPU 211 of the image processing apparatus 101 reading control programs from the ROM 212, the HDD 214 or the like, loading the programs into the RAM 213 and executing the programs.

Firstly, in step S1001, the screen display section 400 detects a scan execution instruction for updating scan data according to an operation of a user using the operation unit 219. Next, the processing proceeds to step S1002, and the screen display section 400, having detected the scan execution instruction, queries the scan data management section 403 for a list of scan data that match on the user ID of the operator. The scan data management section 403 refers to the scan data management table shown in FIG. 7, extracts scan data that matches the user ID of the operator, and provides the list of extracted scan data to the screen display section 400. For example, in the case of FIG. 7, if the user ID of the operator of the image processing apparatus 101 is "USER-A", scan data with scan document ID "0001" and "0002" is extracted.

Next, the processing proceeds to step S1003, and the image display unit 400, having received the scan data list from the scan data management section 403, displays the list of scan data on the operation unit 219 via the operation unit I/F 215. Due to this, the operator of the image processing apparatus 101 can select the scan data that is the target of an update (or editing). In the example in FIG. 7, for example, when the user ID of the operator is "USER-A", "AA meeting minutes" and "AA meeting distribution material" are displayed in the list. Next, the processing proceeds to step S1004, and the screen display section 400 detects the scan data selected with selection operation of the user on the operation unit 219. For example, when, by the operation of the user, "AA meeting minutes" is selected, the screen display section 400 recognizes the scan document ID of the scan data that is the selected update target to be "0001".

Next, the processing proceeds to step S1005, and when the scan data is selected, the screen display section 400 passes the scan document ID of the scan data that was selected to the job processing section 404, and notifies the job processing section 404 with the scan job execution instruction. The job processing section 404, having received the scan job execution instruction, makes a request to the control unit 210 to execute the scan job. The control unit 210 causes the scanner 221 to scan the document via the scanner I/F 217 according to this scan processing execution request. Due to this, the scanner 221, according to the request from the control unit 210, reads in the image on the document to generate image data, and via the scanner I/F 217, sends image data to the control unit 210. The control unit 210, having received the image data, sends the received image data to the job processing section 404 as the scan processing execution result.

Next, the processing proceeds to step S1006, and the job processing section 404, having received the image data, notifies the scan data management section 403 to the effect that the image data will be stored as an update (editing) of scan data corresponding to the scan document ID received from the screen display section 400. The scan data management section 403, having received the notification from the job processing section 404, updates (replaces) with the newly read in image data, scan data corresponding to the scan document ID, and stores it to the scan data DB 405. Then, the scan data management section 403 notifies the job processing section 404 to the effect that the storing of the scan data completed. Next, the processing proceeds to step S1007, and the job processing section 404, having received the storage completion notification, passes the scan document ID to the microblogging communications management section 402, and makes a request for the sending of the comment to the cloud service server 131. The microblogging communications management section 402, having received this request, queries the scan data management section 403 for message IDs corresponding to the scan document ID passed. The scan data management section 403 references the scan data management table, identifies the message ID and returns the message ID to the microblogging communications management section 402. The microblogging communications management section 402 uses the message ID obtained from the scan data management section 403 and, via the communications section 401, identifies the timeline corresponding to the scan data from the timeline obtained from the cloud service server 131. Next, the microblogging communications management section 402 generates a message to the effect that "xxx was updated", and sends a comment to the corresponding timeline via the communications section 401.

A comment 911 of FIG. 9, shows an example of the comment that is sent in step S1007 of FIG. 10.

In FIG. 9, due to the scan data update, the comment 911 (the second message) to the effect of "Updated "AA meeting minutes"" is newly registered as a comment to the message 611 (the first message). In this way it is possible for the user to be notified to the effect that the scan data of "AA meeting minutes" was updated.

As explained above, according to the first embodiment, it is possible to notify the user in an easily understood way of the fact that electronic data that was saved for the purpose of distribution was updated. Specifically, due to the fact that it is possible to provide to the user in an easily understood way the information of what electronic data out of the electronic data saved in the scan data DB was updated and when the data was updated, it is possible to avoid not obtaining the latest version of electronic data or missing distribution.

The Second Embodiment

In the second embodiment of the present invention, explanation will be given for a case where the method of extracting scan data to be updated differs from that of the previously described first embodiment. Note, regarding the image processing section 406 explained in FIG. 4 of the first embodiment, in the second embodiment, in addition to the previously described image processing, processing is carried out in which a degree of similarity of image data is detected. Furthermore, control not described in the explanation of the second embodiment, is the same as that of the first embodiment.

Figure 11:
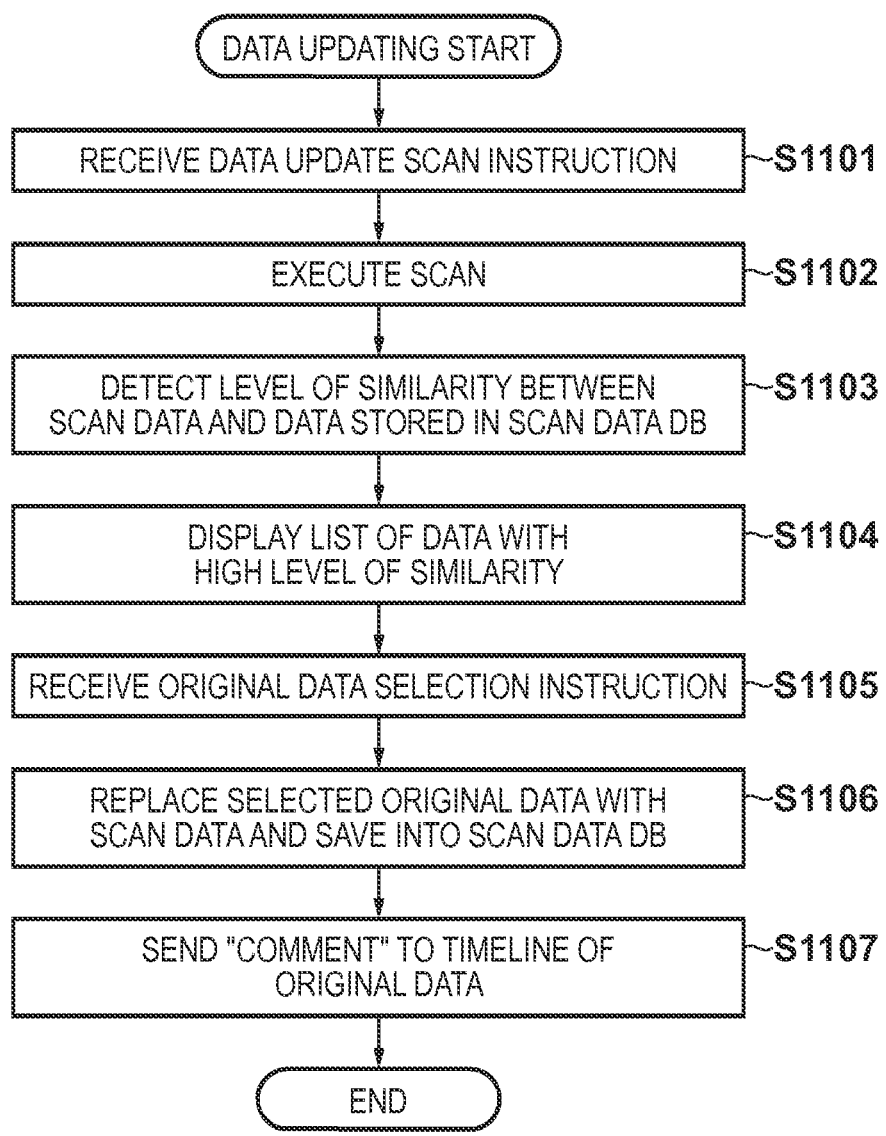
FIG. 11 is a flowchart for describing a processing series that an image processing apparatus carries out when scan data is updated according to a second embodiment of the present invention.

FIG. 11 is a flowchart for describing a processing series that the image processing apparatus 101 carries out when scan data is updated according to a second embodiment of the present invention. This processing is realized through the CPU 211 of the image processing apparatus 101 reading control programs from the ROM 212, the HDD 214 or the like, loading the programs into the RAM 213 and executing the programs.

Firstly, in step S1101, the screen display section 400 detects a scan execution instruction for updating scan data due to an operation by a user using the operation unit 219. Next, the processing proceeds to step S1102, and the screen display section 400, having detected the scan execution instruction, notifies the job processing section 404 with a scan job execution instruction. The job processing section 404, having received the scan job execution instruction, makes a request to the control unit 210 that scan processing be executed. The control unit 210, according to the scan processing execution request, causes the scanner 221 to execute a scan via the scanner I/F 217. Due to this, the scanner 221, according to the request of the control unit 210, reads an image on a document to generate image data, and via the scanner I/F 217, sends image data to the control unit 210. The control unit 210, having received the image data, sends the received image data to the job processing section 404 as a scan processing execution result.

Next, the processing proceeds to step S1103, and the job processing section 404, having received the image data, sends image data to the image processing section 406, and requests the detection of a level of similarity to scan data managed by the scan data management section 403. The image processing section 406 obtains scan data stored in the scan data DB 405 from the scan data management section 403, and obtains the level of similarity between the various scan data and the image data received from the job processing section 404. Next, the image processing section 406 returns to the job processing section 404 a list of scan data for which the level of similarity is greater than a pre-determined value (more similar). Here, the method with which to obtain the level of similarity will not be discussed, but a method that is fast and highly accurate is desirable.

Next, the processing proceeds to step S1104, and the job processing section 404, having received the list of scan data with a high level of similarity, gives the list of scan data to the screen display section 400. Due to this, the screen display section 400, displays the list of scan data on the operation unit 219 via the operation unit I/F 215, so that the operator of the image processing apparatus 101 can select the scan data targeted to be updated. Next, the processing proceeds to step S1105, and the screen display section 400 detects the scan data selection instruction according to the operation of the user via the operation unit 219. Next the processing proceeds to S1106, and the screen display section 400, having detected the scan data selection instruction, notifies the job processing section 404 with the scan document ID of the selected scan data. The job processing section 404, having received the notification with the scan document ID, notifies the scan data management section 403 to the effect that scan data of the scan data DB 405 corresponding to the scan document ID will be updated (overwritten) by the image data obtained in step S1102. The scan data management section 403, having received the notification from the job processing section 404, updates (replaces) the scan data in the scan data DB 405 corresponding to the scan document ID with the newly read in image data. Next, the scan data management section 403, notifies the job processing section 404 to the effect that the scan data storage completed. The processing of step S1107 is the same as the processing of step S1007 of FIG. 10.

As explained above, according to the second embodiment, image data saved in the scan data DB 405 that is the target of an update can be automatically detected by the level of similarity with image data that is read in. Due to this, even if multiple scan data (image data) items exist, the trouble of searching for image data that is the target of an update can be eliminated, and convenience of use can be improved.

The Third Embodiment

In a third embodiment, explanation will be given for a case where scan data is newly added while associating with scan data that is already saved in the scan data DB 405 of the image processing apparatus 101 and is managed by the scan data management section 403. Note, in the third embodiment, the system and apparatus configuration are the same as those in the first and second embodiments and thus explanation will be omitted.

Figure 12:
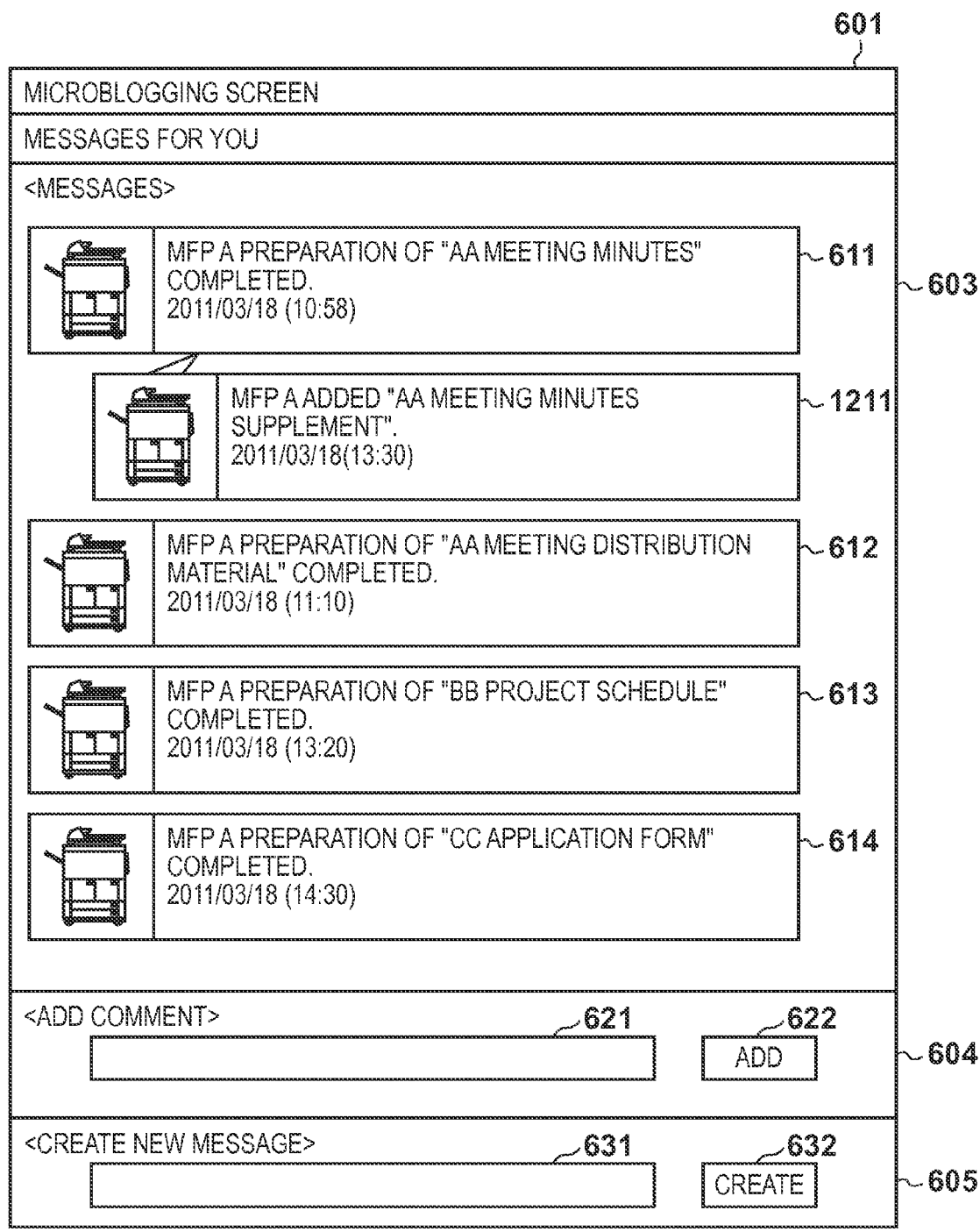
FIG. 12 is a diagram for illustrating an example of a microblogging screen according to a third embodiment of the present invention.

FIG. 12 is a diagram for describing an example of a microblogging screen according to the third embodiment of the present invention. Note, in FIG. 12, parts that are common to previously discussed FIG. 6 displayed with the same reference numbers and the explanations of these parts is omitted.

Figure 14:
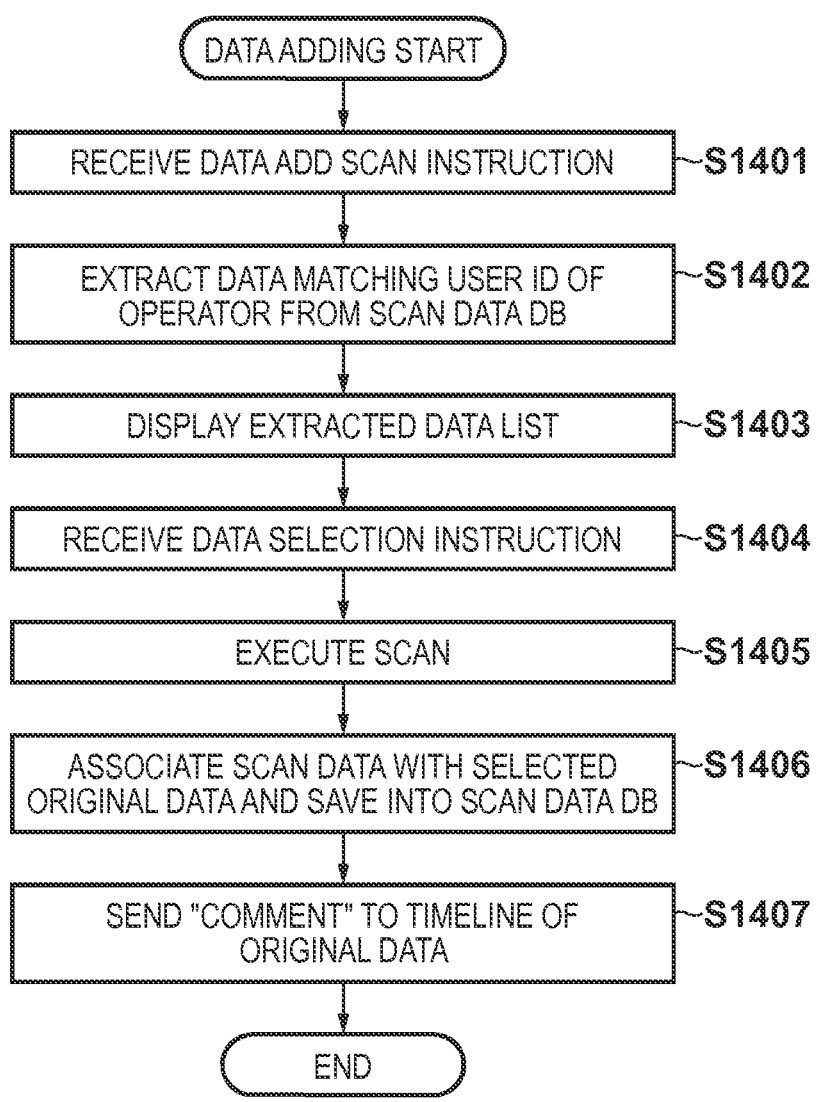
FIG. 14 is a flowchart for describing a processing series that an image processing apparatus carries out when scan data is added according to the third embodiment of the present invention.

Furthermore, in FIG. 13, in the diagram for describing the scan data management table according to the third embodiment, parts that are common to FIG. 7 and displayed with the same reference numerals. FIG. 14 is a flowchart for describing a processing series that the image processing apparatus 101 carries out when scan data is added according to the third embodiment of the present invention. This processing is realized through the CPU 211 of the image processing apparatus 101 reading control programs from the ROM 212, the HDD 214 or the like, loading the programs into the RAM 213 and executing the programs. Furthermore, before the processing sequence of FIG. 14 is performed, the image processing apparatus 101 carries out processing such as authentication of an operator to recognize the user ID that uniquely identifies the operator.

Firstly, in step S1401, the screen display section 400 detects a scan execution instruction for adding scan data due to an operation by a user on the operation unit 219. Here, it is possible to set settings for reading the document and the document name of the read-in electronic data. Settings made in order to read the document such as the setting of resolution, setting of the color mode and setting of whether both sides are to be read can be carried out. Next, the processing proceeds to step S1402, and the screen display section 400, having detected the scan execution instruction, queries the scan data management section 403 for a list of scan data that match on user ID of the operator. The scan data management section 403 references the scan data management table shown in FIG. 7, extracts, from the scan data DB 405, scan data that matches on the user ID of the operator, and provides the extracted list of scan data to the screen display section 400. For example, in FIG. 7, in the case where the user ID is "USER-A", scan data for which the scan document IDs are "0001" and "0002" is extracted.

Next the processing proceeds to step S1403, and the screen display section 400, having received the list of scan data from the scan data management section 403, displays the list of scan data to the operation unit 219 via the operation unit I/F 215. Because to this, it is possible for the user of the image processing apparatus 101 to select the scan data that the user wishes to associate the scan document with. For example, in the case where the user ID of the operator is "USER-A", "AA meeting minutes" and "AA meeting distribution materials" are displayed in the list. Next, the processing proceeds to step S1404, and the screen display section 400 detects the scan data selection instruction that the user carried out by operating the operation unit 219. For example, in the case where, due to user operation, "AA meeting minutes" was selected as the add target data, the screen display section 400 recognizes that the scan document ID for the selected scan data is "0001".

Next, the processing proceeds to step S1405 and the screen display section 400, having detected the scan data selection instruction, passes the scan document ID of the selected scan data to the job processing section 404, and notifies with the scan job execution instruction. The job processing section 404, having received the scan job execution instruction, makes a request to the control unit 210 to execute the scan processing. The control unit 210, according to the scan processing execution request, causes the scanner 221 to execute the scan, via the scanner I/F 217. The scanner 221, according to the request from the control unit 210, generates image data by reading in an image on a document, and sends the image data to the control unit via the scanner I/F 217 to the control unit 210. The control unit 210, having received the image data, sends the received image data as the scan processing execution result, to the job processing section 404.

Next, the processing proceeds to step S1406, and the job processing section 404, having received the image data, notifies the scan data management section 403 to the effect that the image data is to be associated with the scan data corresponding to the scan document ID passed by the screen display section 400, and stored. The scan data management section 403, having received the notification from the job processing section 404, stores the corresponding image data into the scan data DB 405, and adds, as new scan data, the image data to the scan data management table. Next the scan data management section 403 notifies the job processing section 404 to the effect that the storage of the scan data completed. At that time, the message ID of the scan data newly added to the scan data management table is a message ID corresponding to the scan document ID given by the screen display section 400.

FIG. 13 is a diagram for illustrating an example of the scan data management table in this case. In FIG. 13 a record 1311 shows newly added scan data. In step S1404, in the case where "AA meeting minutes" was selected due to the operation by the user, the message ID of the selected scan data is "147051". In the case where the scan data is associated with "AA meeting minutes" and newly added, the message ID of the record 1311 is "147051" which is the same as the message ID of "AA meeting minutes". In other words, scan data items are associated with one another with the message ID.

Next, the processing proceeds to step S1407, and the job processing section 404, having received the notification of scan data storage completion, passes the scan document ID to the microblogging communications management section 402 and requests that a comment be sent to the cloud service server 131. The microblogging communications management section 402, having received the request, queries the scan data management section 403 for a message ID that corresponds to the scan document ID that was passed. The scan data management section 403 references the scan data management table, identifies the message ID, and returns the message ID to the microblogging communications management section 402. The microblogging communications management section 402, by using the message ID obtained from the scan data management section 403, identifies the timeline for the corresponding scan data from the timeline list obtained from the cloud service server 131 via the communications section 401. Next, the microblogging communications management section 402 generates a message to the effect of "xxx was added", sends the comment, via the communications section 401, and completes the processing.

FIG. 12 shows a comment 1211 as an example of a comment sent in step S1407. The other parts of FIG. 12, are the same as those explained in FIG. 6. The comment 1211 of FIG. 12 is registered as a comment for the message 611 at the time that scan data was newly added.

As explained above, according to the third embodiment, it is possible to notify the user in an easy to understand way that image data related to the saved scan data (image data) was added. Specifically, by providing the user with information as to what scan data was added, when the scan data was added, and with what data the scan data was associated, it is possible to limit mistakenly missing to obtain the latest version of electronic data or missing distribution.

The Fourth Embodiment

In a fourth embodiment, a case where the scan data update notification is carried out even when the image processing apparatus 101 sends scan data due to a send instruction from another user of the cloud service server 131. Note, the apparatuses and the system configuration according to the fourth embodiment are the same as those in the previous embodiments and so explanation is omitted.

Figure 15:
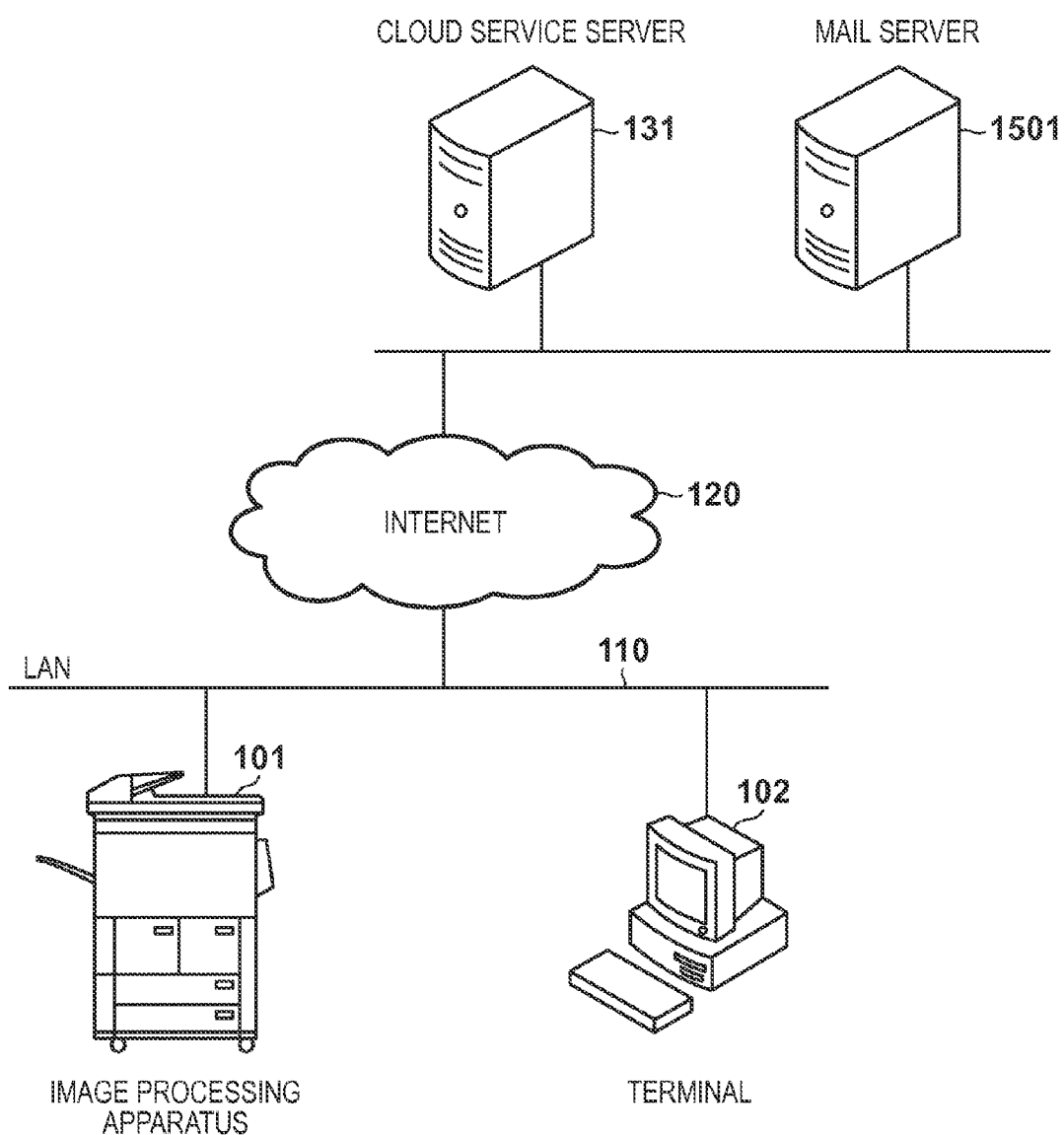
FIG. 15 is a diagram for describing a configuration of an image processing system according to a fourth embodiment of the present invention.

FIG. 15 is a diagram for describing a configuration of an image processing system according to the fourth embodiment of the present invention. As shown in FIG. 15, in the image processing system according to the fourth embodiment a mail server 1501 is provided in addition to the image processing apparatus 101, the terminal 102, and the cloud service server 131 shown in FIG. 1. The mail server 1501 is connected to the image processing apparatus 101 via the Internet 120 and the LAN 110 in the same way as the client service server is. Here, the terminal 102 is connected to the LAN 110, but the present invention is not limited to this. It is enough that the terminal 102 can connect to the cloud service server 131 and to the mail server 1501.

Figure 16:
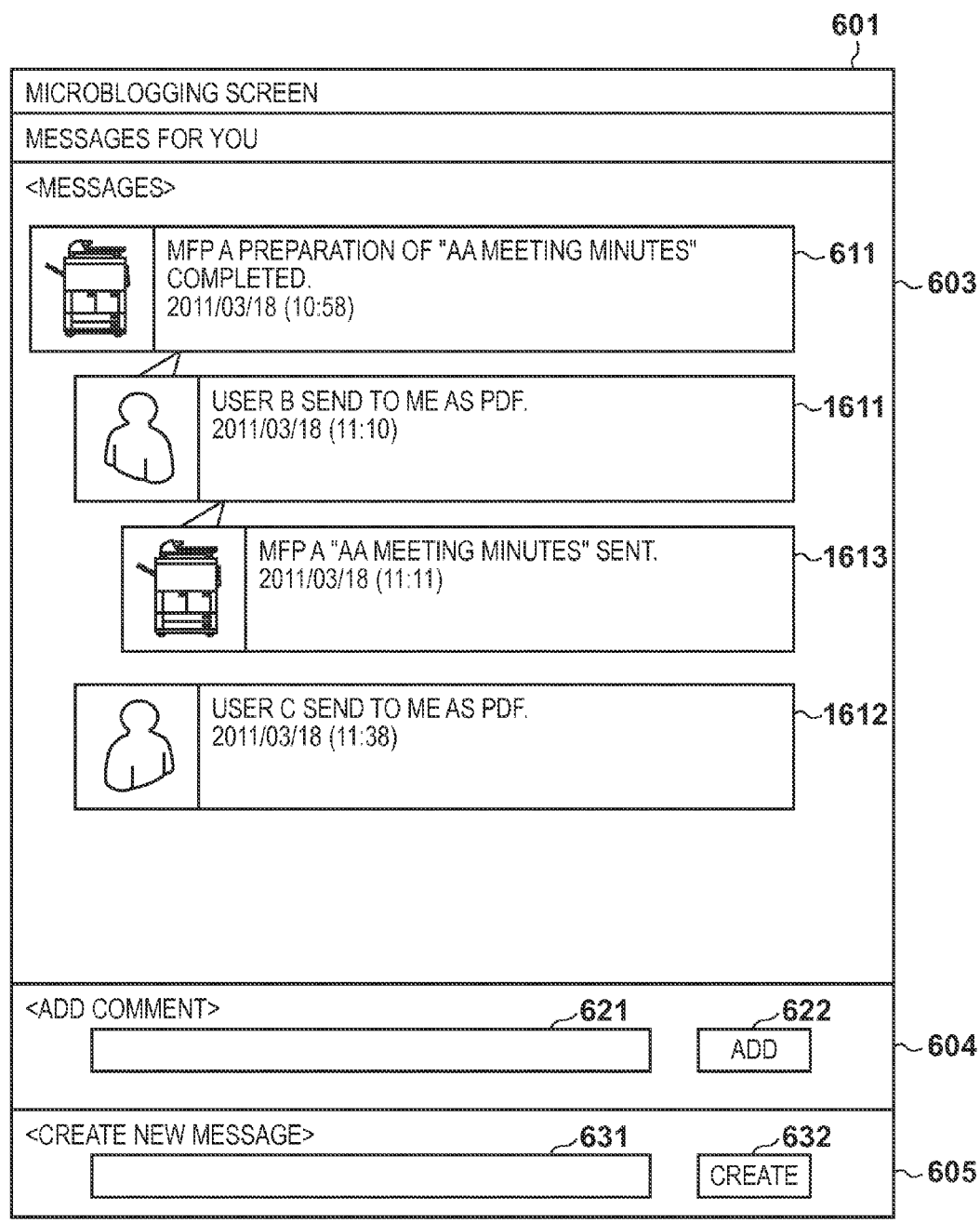
FIG. 16 is a diagram for illustrating an example of a microblogging screen according to the fourth embodiment of the present invention.

FIG. 16 is a diagram for describing an example of a microblogging screen according to the fourth embodiment of the present invention. Note, in FIG. 16, parts that are common to previously described FIG. 6 are shown with the same reference numerals and explanation of these is omitted.

In the message display area 603, it can be seen that MFP A has registered the message 611 that states, "Preparation of "AA meeting minutes" has completed", and in response to the message 611, USER-B has replied with a comment 1611 stating, "Send to me as PDF". Furthermore, in the fourth embodiment, it can be seen that a processing result comment 1613 stating, ""AA meeting minutes" sent", has been returned in response to the comment 1611. In the same way, a comment 1612 shows that USER-C has replied with a comment stating, "Send to me as PDF" in the same way as USER-B.

Figure 17:
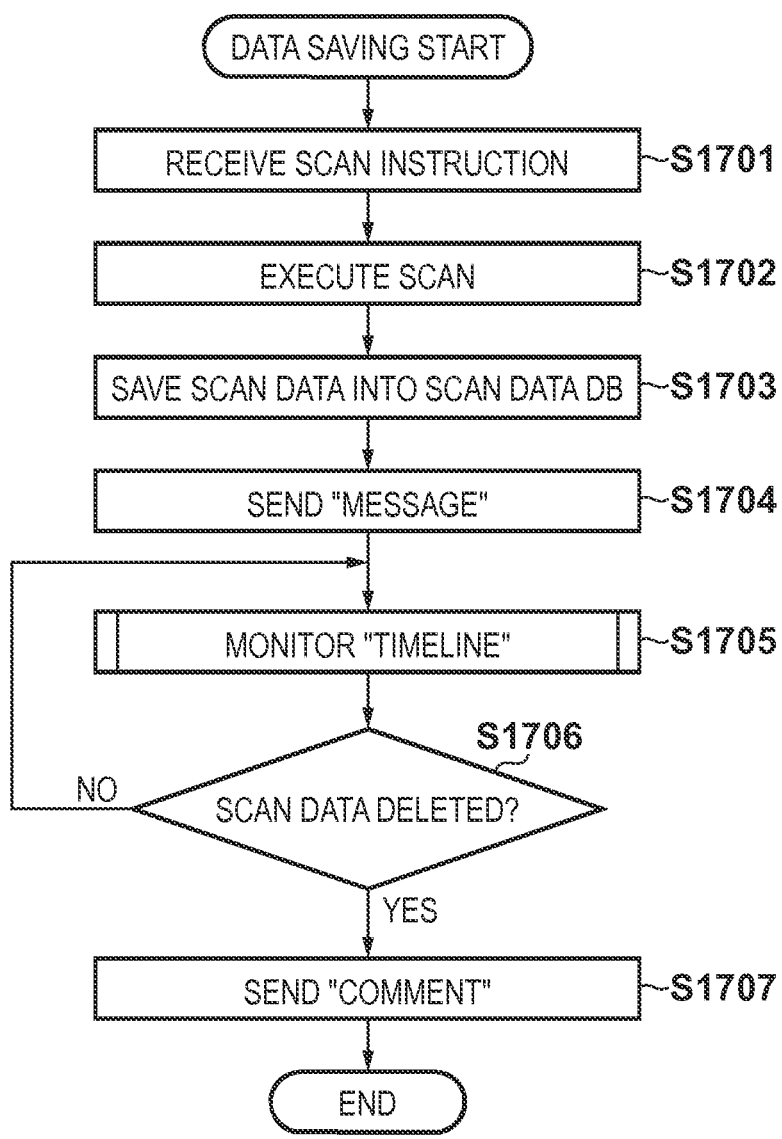
FIG. 17 is a flowchart for describing a processing series starting from a reading operation of image data by an image processing apparatus, including a saving of scan data, and a sending of a message, and continuing until a monitoring of a timeline according to the fourth embodiment of the present invention.

FIG. 17 is a flowchart for describing a processing series starting from a reading operation of image data by the image processing apparatus 101, including a saving of scan data, and a sending of a message, and continuing until a monitoring of a timeline according to the fourth embodiment of the present invention. Note, the processing explained below is realized through the CPU 211 of the image processing apparatus 101 reading control programs from the ROM 212, the HDD 214 or the like, loading the programs into the RAM 213 and executing the programs. Note, the processing of steps S1701 through S1704 are the same as the steps S801 through S804 shown in FIG. 8, and so the explanation of these is omitted.

In step S1705, the CPU 211 monitors the "timeline" of a message registered in step S1704. The method of monitoring is discussed later referring to FIG. 18. Next, the processing proceeds to step S1706, and the scan data management section 403, according to an instruction from a user, determines whether scan data is deleted. In the case where the scan data is deleted, notification to the effect that the scan data was deleted is made to the microblogging communications management section 402, and the processing proceeds to step S1707. On the other hand, in the case where the scan data was not deleted, the processing returns to step S1705, and the monitoring of the timeline is continued.

In step S1707, the microblogging communications management section 402 receives the notification from the scan data management section 403, generates a message containing contents to the effect that "AA meeting minutes was deleted", and sends to the communications section 401 the message as well as a request to send the message. The communications section 401, having received the message send request from the microblogging communications management section 402, sends the received message to the cloud service server 131. Due to the sending of the message to the cloud service server 131, registering of the message to the microblogging function provided by the cloud service server 131 is carried out. Because of this, when a user using a browser accesses the cloud service server 131, it is possible for the user to discern that the document was deleted and that it is in a state in which it cannot be acquired.

Figure 18:
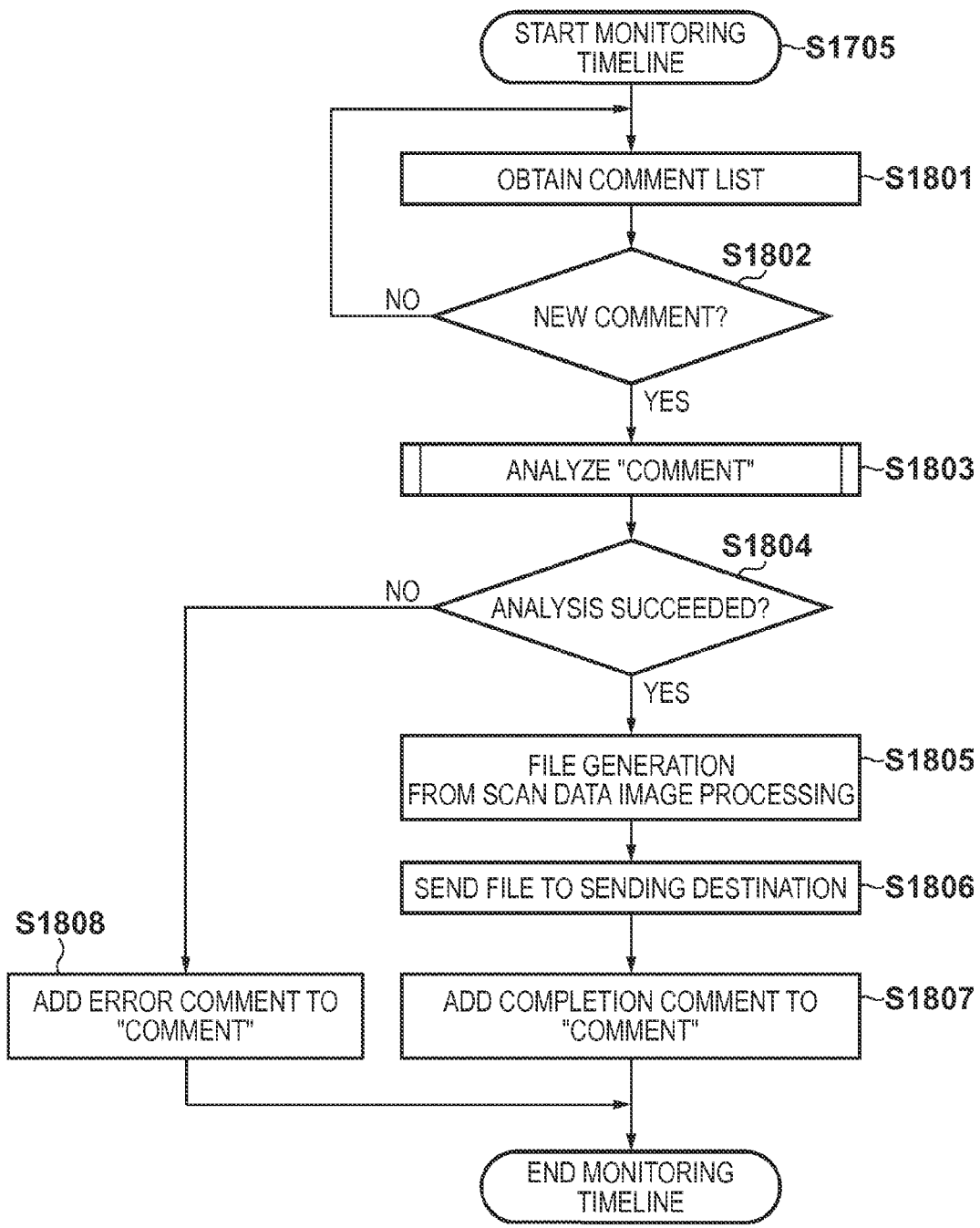
FIG. 18 is a flowchart for describing details of monitoring processing (S1705) by the image processing apparatus according to the fourth embodiment of the present invention.

FIG. 18 is a flowchart for describing details of monitoring processing (S1705) by the image processing apparatus 101 according to the fourth embodiment of the present invention. Note, the processing explained below is realized through the CPU 211 of the image processing apparatus 101 reading control programs from the ROM 212, the HDD 214 or the like, loading the programs into the RAM 213 and executing the programs.

Firstly, in step S1801, the microblogging communications management section 402 obtains comment list information for the message that was registered in S1704 of FIG. 17, via the communications section 401 from the cloud service server 131. Next, the processing proceeds to step S1802, and the CPU 211 determines whether a new comment has been added in response to the message. In the case where a new comment does exist, the processing proceeds to step S1803, and in the case where a new comment does not exist, the processing returns to step S1801, and a check is regularly made to see whether a new comment has been added. Here, the determination of whether a new comment exists is done by determining whether the user of a sub-comment of each comment is the user set for the image processing apparatus 101. For example, in the case of FIG. 16, in the comment list for the message 611, the comment 1611 and the comment 1612 can be obtained as the list. Furthermore, the comment 1613 can be obtained as a comment of the comment 1611. The user information of the comment 1613 is the user information of the image processing apparatus 101. Accordingly, with the determination of step S1802, it can be determined that the comment 1613 was not added as a new comment. On the other hand, for the comment 1612 there are no comments, and therefore the comment 1612 can be determined to be a new comment. Note, the processing by the image processing apparatus 101 for sending comments such as that for the comment 1613 is discussed later.

In step S1803, the CPU 211 analyzes the new comment obtained in step S1802, identifies the instruction of the sender of the comment, and performs the processing of the subsequent steps. The comment analysis processing will be discussed later using FIG. 19. Next, the processing proceeds to step S1804 and the CPU 211 determines whether the comment analysis processing of step S1803 succeeded. In the case where the comment analysis processing succeeded, the processing proceeds to step S1805, and in the case where the comment analysis processing fails, the processing proceeds to step S1808. In step S1805, the CPU 211 makes an instruction to the image processing section 406 to change the file format. The format to change into here, is decided based on the result of the comment analysis processing of step S1803. Due to this, the image processing section 406 obtains scan data stored in step S1703 via the scan data management section 403. Here, by searching for the scan data for the message ID stored in step S1703 in the scan data image management table, the scan data is identified.

Next, the processing proceeds to step S1806, and the CPU 211 instructs the communications section 401 to send the electronic file generated in step S1805. The sending destination is determined by the result of the comment analysis processing of step S1803. The communications section 401 obtains the electronic file from the image processing section 406 and sends an electronic mail with the electronic file attached to the mail server 1501. Due to this, it is possible to send the electronic file for which image processing was carried out to the user that sent the comment. It is also possible to send the file to a file sharing function provided by the cloud service server 131 depending on the result of the comment analysis processing of step S1803 and not just send an electronic mail. In this way, when in step S1806 a file is sent, the processing proceeds to step S1807, and the microblogging communications management section 402 generates a message to the effect of "sent", the comment is sent via the communications section 401 and the processing completes. Due to this, it is possible to notify, via the cloud service server 131, the user that sent the comment that the processing completed. For example, in the case of FIG. 16 the comment 1613 is a comment sent in step S1807. Furthermore, at the same time, in step S1802, when determining whether a comment was added, by ascertaining whether there is a comment that was added in step 1807, it is possible to determine if a comment was added.

On the other hand, when in step S1804 the analysis processing failed, the processing proceeds to step S1808, and the microblogging communications management section 402 generates a message to the effect of "sending failed" and sends the comment via the communications section 401. Due of this, it is possible to notify the user that sent the comment that the processing failed. Also, at the same time, in step S1802, when determining whether a comment has been added, by ascertaining whether there is a comment that was added in step 1808, it is possible to determine if a comment was added. Also, it is possible make comments on the timeline for purposes other than controlling the image processing apparatus 101. Furthermore, in the comment analysis processing of step S1803, not sending an error comment only in the case where a command string could not be found can also be done.

Figure 19:
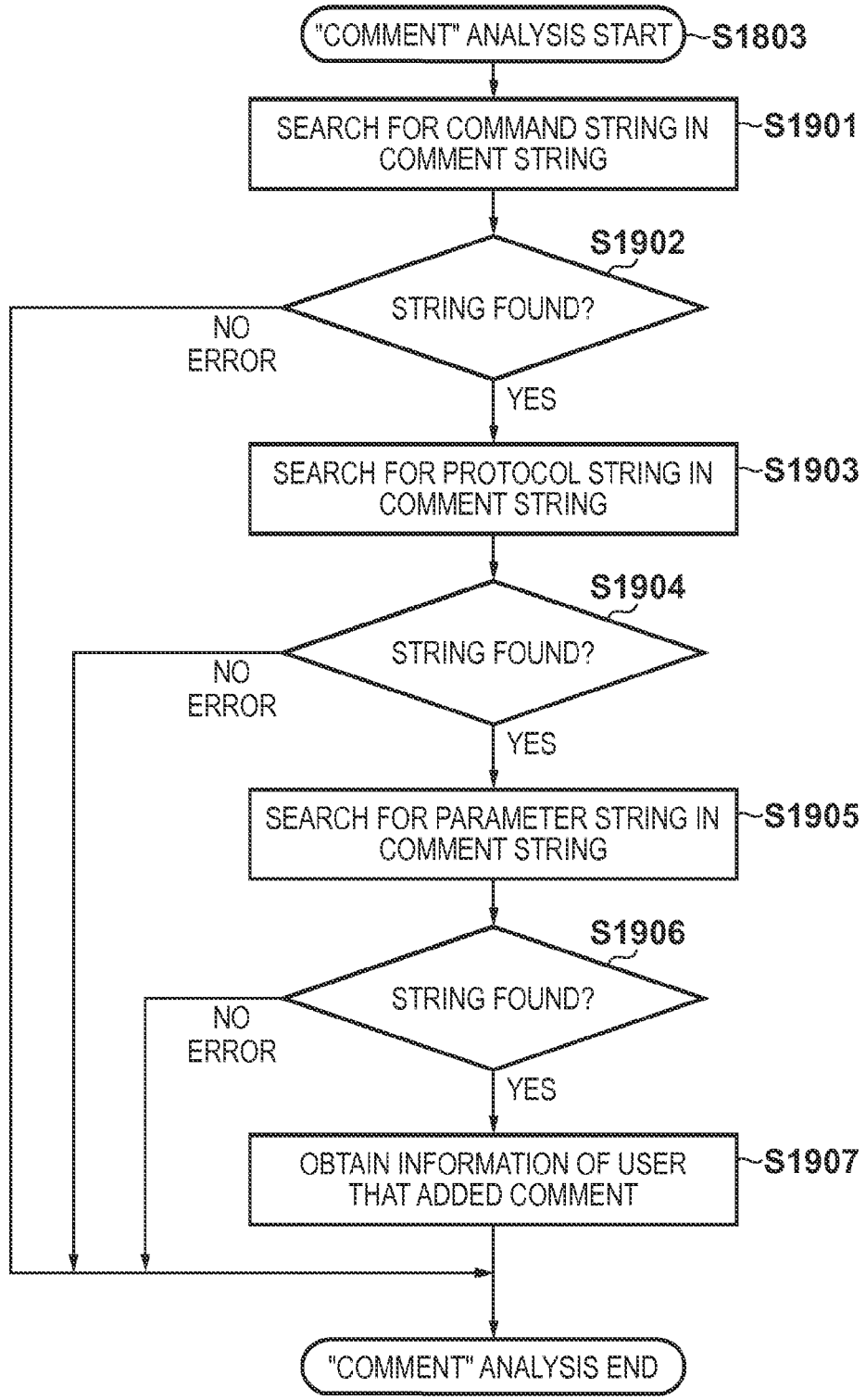
FIG. 19 is a flowchart for describing details of analysis processing (S1803) by the image processing apparatus according to the fourth embodiment of the present invention.

FIG. 19 is a flowchart for describing details of analysis processing (S1803) by the image processing apparatus 101 according to the fourth embodiment of the present invention. Note, the processing explained below is realized through the CPU 211 of the image processing apparatus 101 reading control programs from the ROM 212, the HDD 214 or the like into the RAM 213 and executing the programs. Note, in this flowchart, the microblogging communications management section 402, in step S1802, analyzes the detected new comment. A comment shall be of the following format ("Send to me as PDF"). The microblogging communications management section 402 identifies the mail server 1501 that is the sending destination for the image data, the user of the mail server 1501 that shares the image data sent, and the data format of the image data to send.

Firstly, in step S1901, the microblogging communications management section 402, searches the comment string for a command string in a command string management table 2000 shown in FIG. 20A. In the command string management table 2000, associations of command strings 2001 and processing functions 2002 are defined. For example, that "send" indicates a sending function and that "print" indicates a printing function is defined. Next, in step S1902, the CPU 211 determines based on the result of step S1901 whether to continue the processing sequence of this flowchart. In the case where, in step S1901, the command string was found, the processing proceeds to step S1903, and in the case where, in step S1901, the command string was not found, the comment cannot be processed and thus the processing finishes in error. In the case of the comment described above, because "Send" is included in the comment, the processing function is determined to be a send function.

Next, in step S1903, the microblogging communications management section 402 searches the comment string for a protocol string in a protocol string management table 2010 of FIG. 20B. In the protocol string management table 2010, associations of protocol strings 2011 and processing functions 2012 are defined. For example, that "me" indicates a sending function and a sending destination and that "document" indicates a cloud service server 131 storage function is defined. Next, in step S1904, the CPU 211 determines based on the result of step S1903 whether to continue the processing sequence of this flowchart. In the case where, in step S1903, the protocol string was found, the processing proceeds to step S1905, and in the case where the command string was not found, the comment cannot be processed and thus the processing finishes in error. In the case of the comment described above, because "me" is included in the comment, the processing function is determined to be a send function.

Next, the processing proceeds to step S1905, and the microblogging communications management section 402 searches the comment string for a parameter string in a parameter string management table 2020 of FIG. 20C. In the parameter string management table 2020, associations of parameter strings 2021 and processing functions 2022 are defined. For example, that "pdf" indicates pdf conversion processing and that "jpeg" indicates jpeg conversion processing is defined. Next, in step S1906, the CPU 211 determines, based on the result of step S1905, whether to continue the processing sequence of this flowchart. In the case where, in step S1905, the parameter string was found, the processing proceeds to step S1907, and in the case where the command string was not found, the comment cannot be processed and thus the processing finishes in error. In the case of the comment described above, because "PDF" is included in the comment, the processing function is determined to be a PDF conversion function. Note, the command string management table 2000, the protocol string management table 2010, and the parameter string management table 2020, are examples of string tables, and each of them is stored beforehand in the memory of the HDD 214, etcetera.

Next, in step S1907, the CPU 211 obtains sending destination information for the processing function found in step S1903. The microblogging communications management section 402 sends the comment ID to the cloud service server 131 and obtains user information of the sender of the comment. Included in the user information in the microblogging function is information for attributes of that user. Examples include a facial picture, a name, contact details (telephone number, mail address, street address, etcetera), affiliated organizations, and language. Using this information it is possible to determine a partner with communication is carried out on the microblogging function. Furthermore, on the microblogging function, there are functions for such things as grouping of a plurality of users having a common attribute, and changing the type of information, or functions provided, etcetera. The mail address included in this user information is obtained and the processing completes. By determining the sending destination information from the user information, it becomes possible to streamline the input operation of the mail address.

Figure 22:
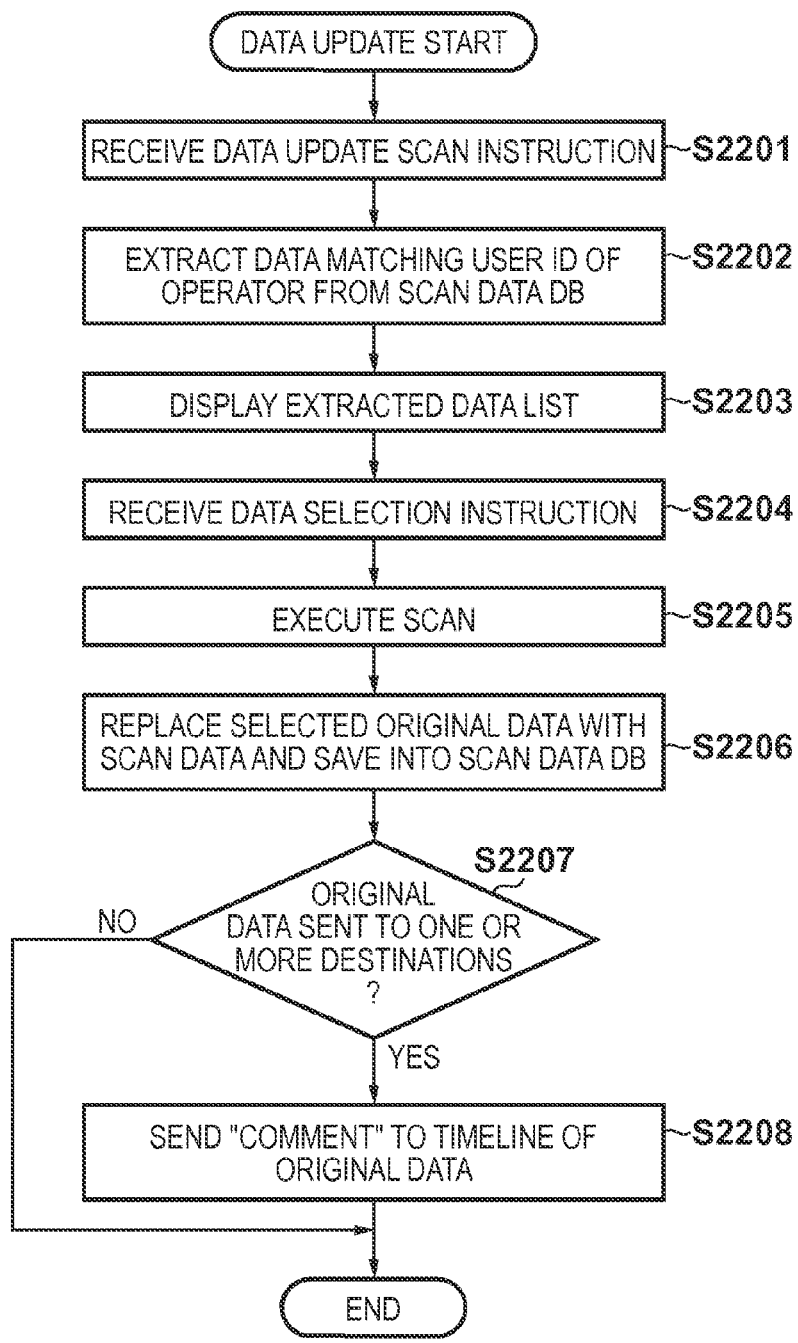
FIG. 22 is a flowchart for describing a processing series that the image processing apparatus carries out when scan data is updated according to the fourth embodiment of the present invention.

FIG. 22 is a flowchart illustrating a processing series that the image processing apparatus 101 carries out when scan data is updated according to the fourth embodiment of the present invention. Note, the processing explained below is realized through the CPU 211 of the image processing apparatus 101 reading control programs from the ROM 212, the HDD 214 or the like into the RAM 213 and executing the programs. Furthermore, before the processing sequence of FIG. 22 is performed, the image processing apparatus 101 carries out processing such as authentication of an operator to recognize the user ID that uniquely specifies the operator. Because the processing from steps S2201 to S2206 is the same as the processing from steps S1001 to S1006 in FIG. 10, the explanation thereof is omitted.

In step S2207, the job processing section 404, having received the scan data storage completion notification, passes the scan document ID, to make a request, to the microblogging communications management section 402, for the sending of the comment to the cloud service server 131. The microblogging communications management section 402, having received the request, queries the scan data management section 403 for the message ID corresponding to the scan document ID passed. The scan data management section 403 references the scan data management table, identifies the message ID, and returns the message ID to the microblogging communications management section 402. The microblogging communications management section 402 by using the message ID obtained from the scan data management section 403, obtains a list of comments for the scan data from the cloud service server 131 via the communications section 401. Then, the microblogging communications management section 402 determines whether the scan data before being updated has already been sent to one or more addresses. Here, in the case where it is determined that the scan data before being updated has already been sent to one or more addresses, the processing proceeds to step S2208, and in the case where it is determined that the scan data has not been sent, the processing is completed without sending the comment.

The determination of whether the scan data has been sent is, for example, in the case of FIG. 16, determined based on whether the comment 1611, in which the user instructs the sending of scan data, and the comment 1613, to the effect that the image processing apparatus 101 sent scan data in response to the comment 1611, exist.

In step S2208, the microblogging communications management section 402 generates a message to the effect of "updated xxx", sends the comment via the communications section 401, and concludes the processing.

Figure 21:
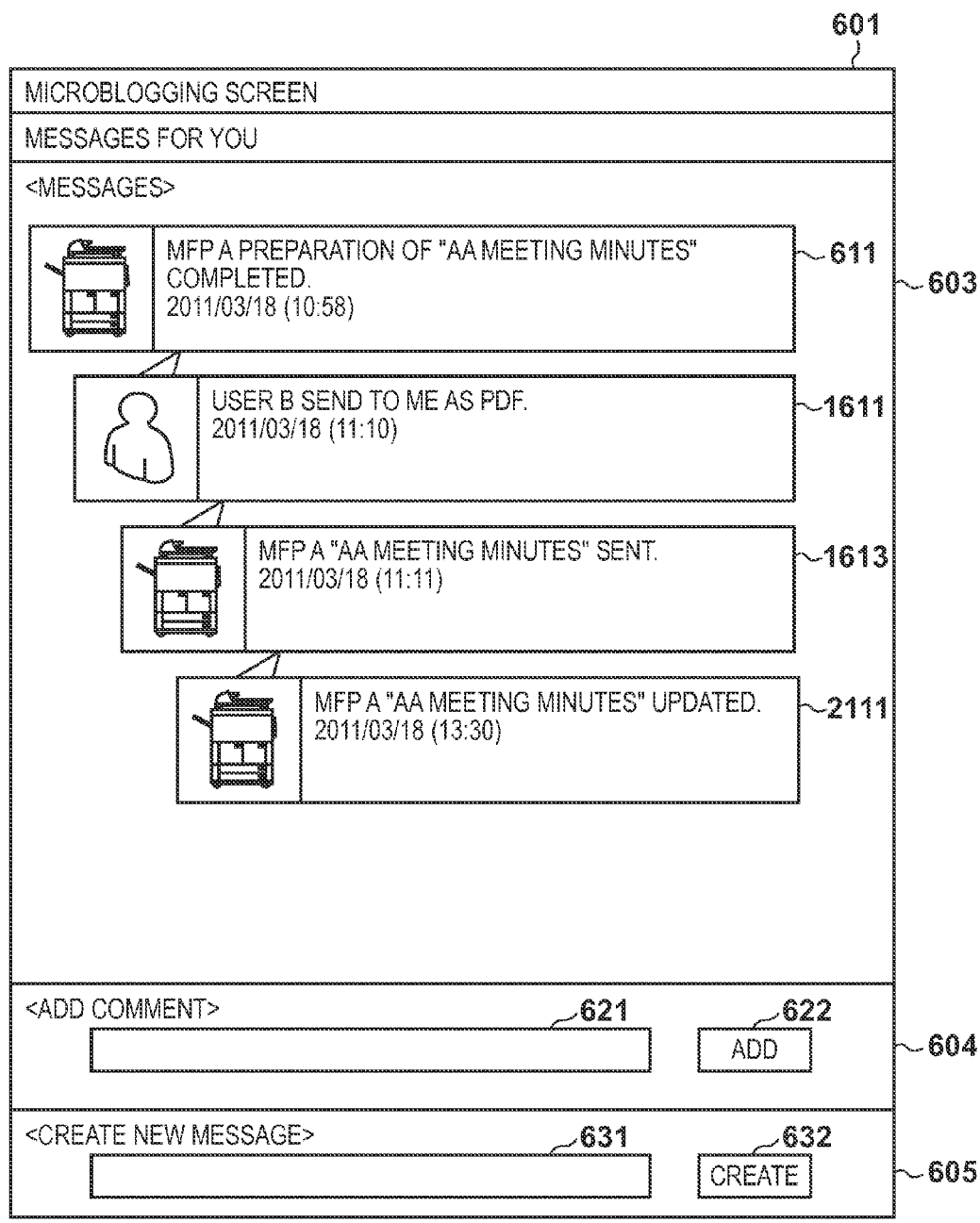
FIG. 21 is a diagram for illustrating an example of a microblogging screen according to the fourth embodiment of the present invention.

An example of a comment sent in step S2208 is the comment 2111 in FIG. 21.

FIG. 21 is a diagram for describing an example of a microblogging screen according to the fourth embodiment of the present invention.

In FIG. 21, other parts are the same as in FIG. 6 or FIG. 16. In FIG. 21, because the comment 1611 and the comment 1613 exist, it is determined that the scan data has already been sent to USER-B. As a result of the update of the scan data, by newly registering a comment 2111 stating, ""AA meeting minutes" updated" as a sub-comment of the comment 1613, it is possible to notify USER-B that the scan data has been updated.

As explained above, according to the fourth embodiment, even in the case where the electronic data before updating has been sent to one or more of the distribution destinations, it is possible to notify the user to whom the data was already sent with the updated electronic data, and thus mistakenly missing obtaining the latest version of electronic data can be limited.

The Fifth Embodiment

In a fifth embodiment, a case where scan data is added and also associated with scan data that is already saved in the scan data DB 405 of the image processing apparatus 101, and managed in the scan data management section 403, is explained. Note, control that is not described in the explanation of the fifth embodiment is the same as that in the first through fourth embodiments. The image reading, scan data adding and message sending processing in the fifth embodiment is fundamentally the same as the processing described in FIG. 14 of the third embodiment. However, in the fifth embodiment, in step S1407, there are cases where the register index of the comment sent to the cloud service server 131 is different.

Figure 23:
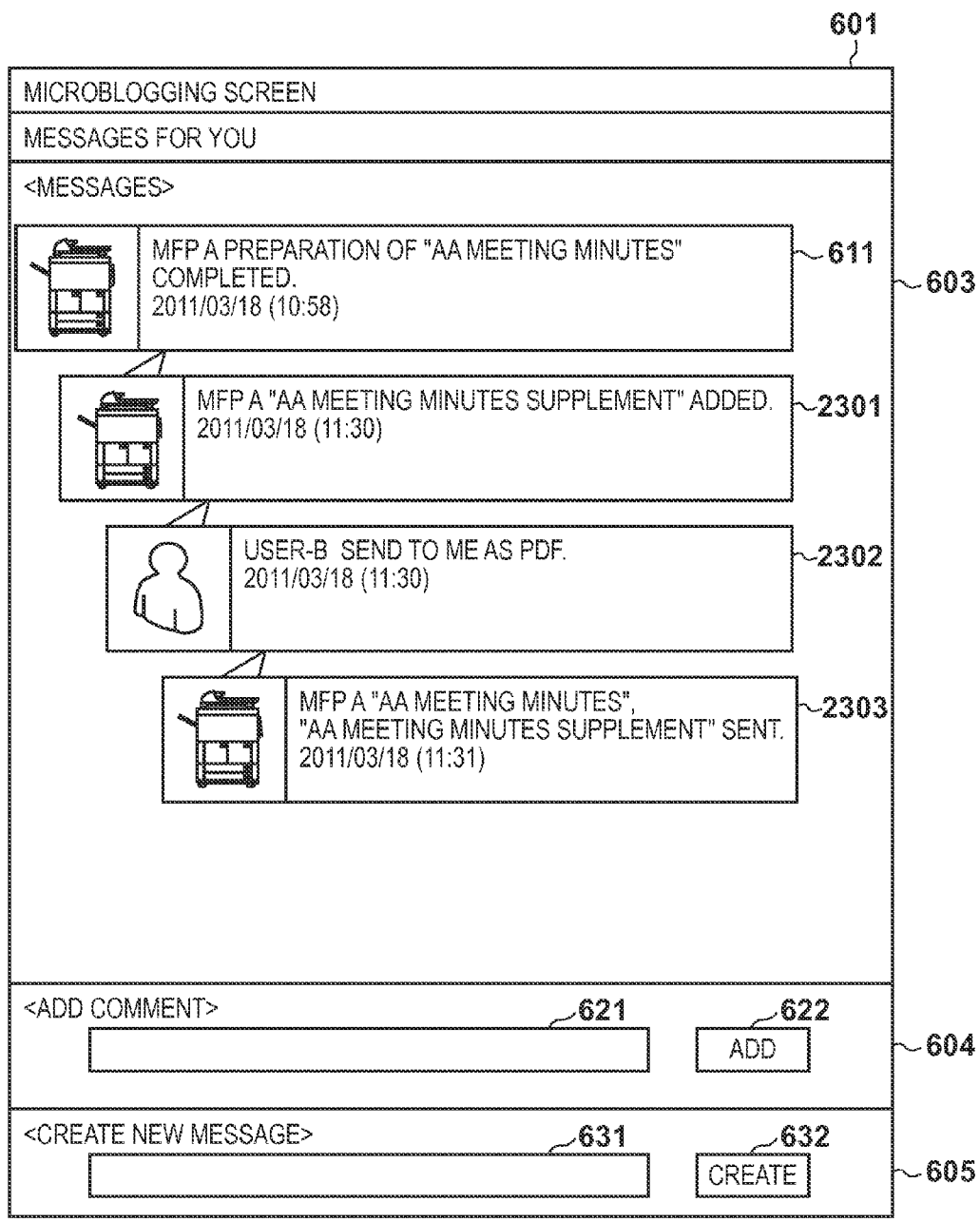
FIG. 23 is a diagram for illustrating an example of a microblogging screen according to a fifth embodiment of the present invention.
Figure 24:
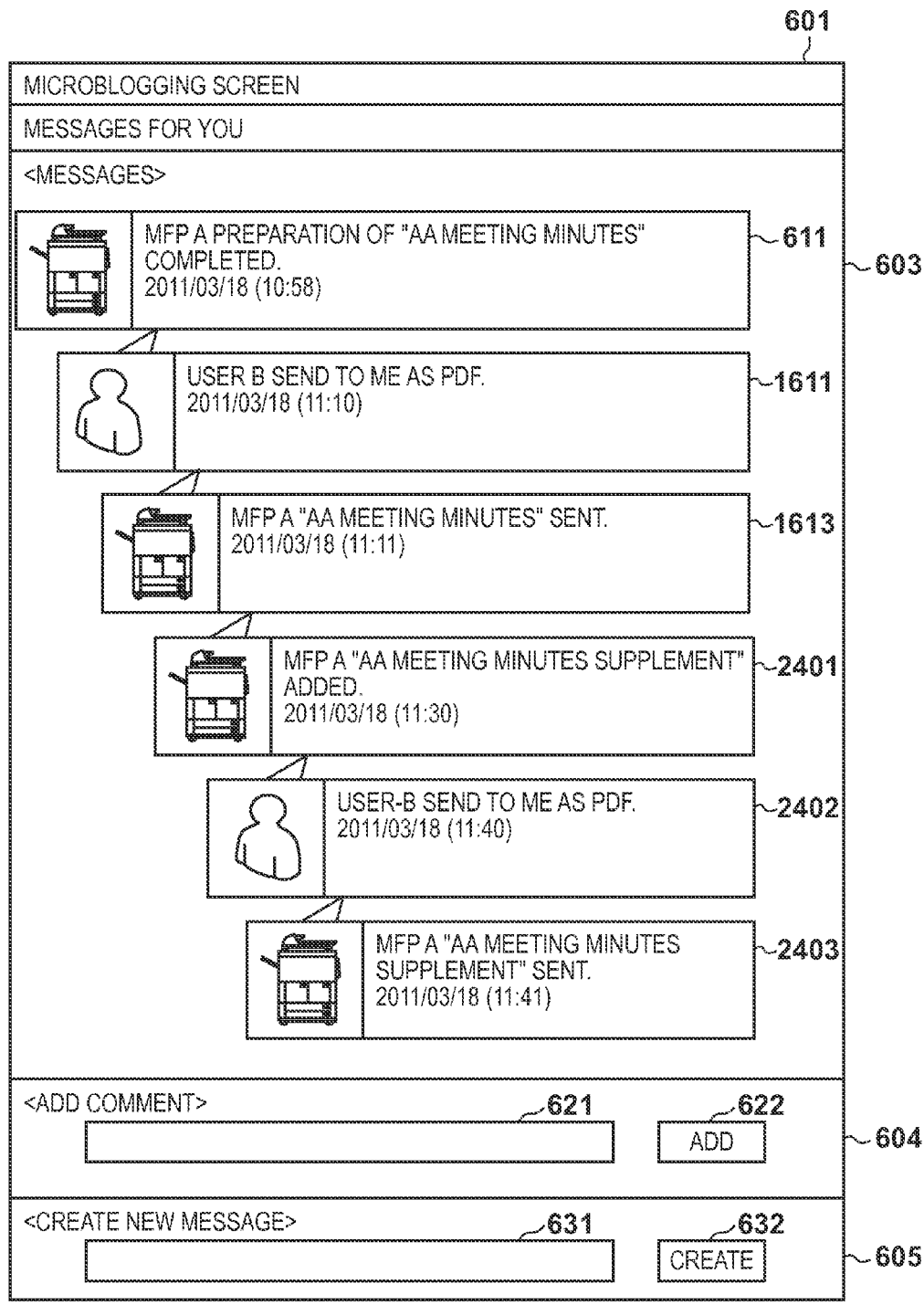
FIG. 24 is a diagram for illustrating an example of a microblogging screen according to the fifth embodiment of the present invention.

Examples of a comments sent in step S1407 of the fifth embodiment are a comment 2301 of FIG. 23 and a comment 2401 shown in FIG. 24.

FIG. 23 and FIG. 24 are diagrams that explain the microblogging screen according to the fifth embodiment. Note, in FIG. 23 and in FIG. 24, other parts are the same as those explained in FIG. 6.

The comment 2301 of FIG. 23 is an example of a comment sent in the case where comments from users for the message 611 did not exist at the point when the scan data was newly added, and the comment 2301 is registered as a sub-comment of the message 611. Note, a comment 2302 and a comment 2303 are explained later. The comment 2401 of FIG. 24, shows the case where at the point when the scan data was newly added, the comment 1611 and the comment 1613 already existed as sub-comments of the message 611. In other words, here an example of a comment, that was sent in the case where scan data was already sent to USER-B, is shown, and the comment 1613 is registered as a sub-comment. Note, a comment 2402 and a comment 2403 are described later.

Figure 25:
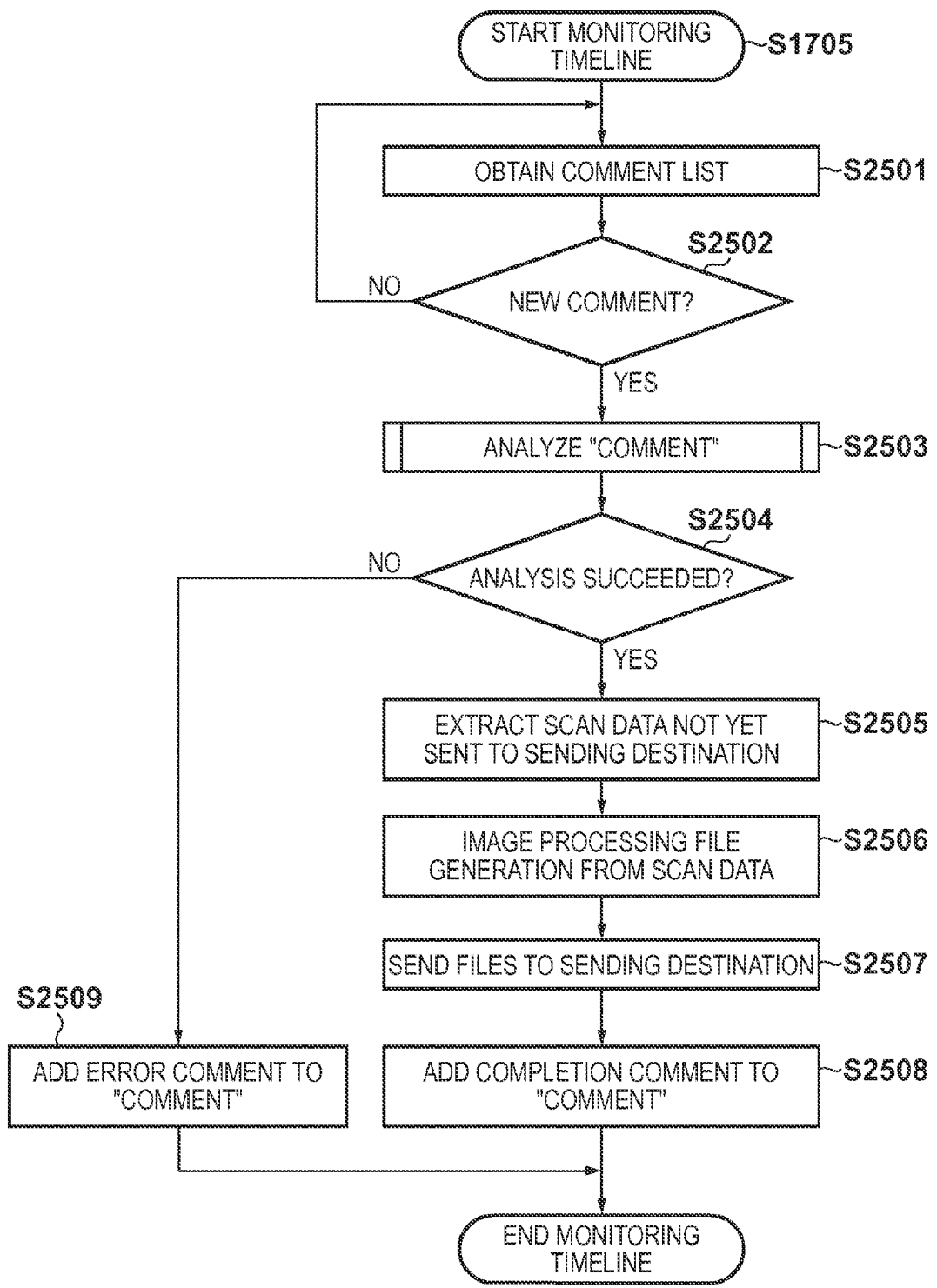
FIG. 25 is a flowchart for describing details of monitoring processing (S1705) by an image processing apparatus according to the fifth embodiment of the present invention.

FIG. 25 is a flowchart for describing details of monitoring processing (S1705) by the image processing apparatus 101 according to the fifth embodiment of the present invention. The processing explained below is realized through the CPU 211 of the image processing apparatus 101 reading control programs from the ROM 212, the HDD 214 or the like into the RAM 213 and executing the programs.

In step S2501, the microblogging communications management section 402 obtains from the cloud service server 131 via the communications section 401 comment list information for the message that was registered in step S1704 of the fourth embodiment. Next, the processing proceeds to step S2502, and the microblogging communications management section 402 determines whether a new comment has been added in response to the message. In the case where a new comment exists, the processing proceeds to step S2503, and in the case where no new comment exists, the processing returns to step S2501, and it is checked regularly whether a new comment has been added. The determination of whether a new comment exists is the same as the determination processing in step S1802 (FIG. 18) of the fourth embodiment.

Next, in step S2503, the microblogging communications management section 402 carries out analysis of the new comment obtained in step S2502, identifies the instruction in the comment of the sender, and performs the subsequent processing. Analysis processing is the same as in step S1803 in the fourth embodiment. Next, in step S2504, the microblogging communications management section 402 determines whether the analysis processing in step S2503 succeeded. In the case where the analysis processing succeeded, the processing proceeds to step S2505, and in the case where the analysis processing failed, the processing proceeds to step S2509. In step S2505, the microblogging communications management section 402 references the comment list information obtained in step S2501, extracts scan data that has not yet been sent to the sending destination instructed by the sender of the new comment, and passes the extracted scan data list to the job processing section 404.

For example, in the case of FIG. 23, in the case where the microblogging communication management unit 402 obtains the comment list of FIG. 23, and the microblogging communication management unit 402 determines that the comment 2302 is a new comment, it is possible to determine that "AA meeting minutes" and "AA meeting minutes supplement" are scan data that has not been sent. In this case, the microblogging communications management section 402 extracts both "AA meeting minutes" and "AA meeting minutes supplement" as unsent scan data.

On the other hand, in the case of FIG. 24, the microblogging communication management unit 402 obtains the comment list of FIG. 24. Next, in the case where the microblogging communication management unit 402 determines that comment 2402 is a new comment, it is determined that "AA meeting minutes" has already been sent, and "AA meeting minutes supplement" is scan data that has not yet been sent. In this case, the microblogging communication management unit 402 extracts the scan data of "AA meeting minutes supplement" as unsent scan data.

In step S2506, the job processing section 404, having received the list of scan data extracted as unsent scan data, passes the scan data to the image processing section 406, and instructs a file format conversion. The file format to be converted into is determined by the result of the analysis processing of the comment in step S2503. The image processing section 406, via the scan data management section 403, obtains all of the scan data that was passed as a list, and carries out the file format conversion. Next, the processing proceeds to step S2507, and the job processing section 404 instructs the communications section 401 to send all of the electronic files generated in step S2506. The sending destination is determined by the result of the analysis processing in step S2503. The communications section 401 obtains all of the electronic files from the image processing section 406 and sends a mail with the electronic files attached to the mail server 1501. Because of this it is possible to send all of the unsent electronic files to the user that sent the comment. It is also possible to send the file to a file sharing function provided by the cloud service server 131 depending on the result of the comment analysis processing of step S2503 and not just send an electronic mail. When the file is sent, the processing proceeds to step S2508, and the microblogging communication management unit 402 generates a message to the effect of "xxx was sent", sends the comment via the communications section 401, and completes the processing. Due to this, it is possible to notify the user via the cloud service server 131 that sent the comment that the processing completed.

For example, in the case of FIG. 23, the comment 2303 is a comment indicating that the electronic file was sent. In the case of FIG. 23, in step S2505, "AA meeting minutes" and "AA meeting minutes supplement" and both extracted as unsent scan data, and in step S2507 both pieces of data are sent as electronic files. For this reason, in step S2508, the comment 2303 stating, ""AA meeting minutes" and "AA meeting minutes supplement" were sent" is sent.

On the other hand, in the case of FIG. 24, the comment 2403 is a comment indicating that an electronic file was sent. In the case of FIG. 24, in step S2505, only the scan data of "AA meeting minutes supplement" is extracted as unsent data, and in step S2507, only the scan data of "AA meeting minutes supplement" is sent as an electronic file. For this reason, in step S2508, the comment 2403 stating, ""AA meeting minutes supplement" was sent" is sent.

As explained above, according to the fifth embodiment, it is possible to notify a user in an easy to understand way that electronic data related to electronic data that was saved mainly for the purpose of distribution was added. Also, by avoiding duplicate sending of added electronic data, sending can be carried out efficiently.

This invention is not limited to using the message ID for making associations between scan data as is used in the third through fifth embodiments of this invention. For example, it is also possible to configure so that a user BOX function provided by the image processing apparatus 101 is used, and to make associations between multiple scan data stored in one user BOX.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-036763, filed Feb. 22, 2012, which is hereby incorporated by reference herein in its entirety.

What is claimed is:

1. An image processing apparatus capable of communicating with a server having a microblogging function for making available a message registered by a user to another user, the image processing apparatus comprising:
    an input unit configured to input image data;
    a storage unit configured to store image data;
    a registration unit configured to register a first message to the server in a case where the image data input by the input unit is stored by the storage unit;
    an extraction unit configured to extract, when an instruction is made for editing of image data, the image data stored by the storage unit being associated with the instruction;
    an editing unit configured to edit, when editing target image data is selected from the image data extracted by the extraction unit, the editing target image data with the image data input by the input unit; and
    a control unit configured to control so that, in a case where the editing target image data is edited by the editing unit, a second message, that indicates that the image data has been edited, is registered to the server associated with the first message which is related to the editing target image data.

2. The image processing apparatus according to claim 1, wherein:
    the extraction unit extracts, from the storage unit, image data of a user that made the instruction for editing.

3. The image processing apparatus according to claim 1, wherein:

the extraction unit obtains a level of similarity between image data input by the input unit and image data being stored by the storage unit, and extracts image data for which the level of similarity is higher than a predetermined value.

4. The image processing apparatus according to claim 1 wherein:

the editing unit updates image data that is being stored by the storage unit with the image data input by the input unit, or adds image data input by the input unit to image data that is being stored by the storage unit.

5. The image processing apparatus according to claim 1, further comprising:

a list display unit configured to display, in a case where there is a plurality of pieces of image data extracted by the extraction unit, a list of image data, wherein the editing unit makes image data, that an operator selected from out of the list displayed by the list display unit, to be editing target data.

6. The image processing apparatus according to claim 5, further comprising:

a table for managing at least identifier information, a document name, and user identification information of image data that was stored in the storage unit, wherein the list display unit references the table and displays a list of image data for which user identification information matches a user that made the instruction for editing.

7. The image processing apparatus according to claim 1, wherein:

the input unit inputs image data obtained by reading a document.

8. The image processing apparatus according to claim 1, further comprising:

a monitoring unit configured to monitor a timeline of the microblogging function;

a sending unit configured to generate, when the monitoring unit finds a new comment, according to the new comment, an image file for corresponding image data that is stored in the storage unit, and to send the image file to a sending destination instructed in the new comment.

9. The image processing apparatus according to claim 8, further comprising:

a unit configured to register to the server, in a case where sending of the image file by the sending unit completed, a message for indicating that sending of the image file completed.

10. The image processing apparatus according to claim 8, wherein:

the sending unit, in a case where the monitoring unit detects a new comment, only sends an unsent image file that has not been sent to the destination.

11. A control method for controlling an image processing apparatus capable of communicating with a server having a microblogging function for making available a message registered by a user to another user, the method comprising:

inputting image data;

storing image data;

registering a first message to the server in a case where image data input in the inputting step is stored in the storing step;

extracting, when an instruction is made for editing of image data, image data stored in the storing step being associated with the instruction;

editing, when editing target image data is selected from image data extracted in the extracting step, the editing target image data with the image data input in the inputting step; and controlling so that, in a case where the editing target image data is edited in the editing step, a second message, that indicates that the image data has been edited, is registered to the server associated with the first message, which is related to the editing target image data.

12. A non-transitory computer-readable storage medium storing a program for causing a computer to execute each step of the control method defined in claim 11.

* * * * *